US012104963B1

(12) United States Patent
Wang et al.

(10) Patent No.: US 12,104,963 B1
(45) Date of Patent: Oct. 1, 2024

(54) FOOD THERMOMETER, REPEATER AND FOOD THERMOMETER ASSEMBLY

(71) Applicants: Zhuhai Megain Technology Co., Ltd., Zhuhai (CN); OURSALE TRADING INC, Denver, CO (US)

(72) Inventors: Hua Wang, Zhuhai (CN); Haiji Qiu, Zhuhai (CN); Yifeng Cai, Zhuhai (CN); Xiaoling Tao, Zhuhai (CN); Chunsheng Yang, Zhuhai (CN); Xungui Wang, Zhuhai (CN); Huayou Li, Zhuhai (CN); Xiangui Tu, Zhuhai (CN)

(73) Assignees: Zhuhai Megain Technology Co., Ltd., Zhuhai (CN); OURSALE TRADING INC, Denver, CO (US)

( * ) Notice: Subject to any disclaimer, the term of this patent is extended or adjusted under 35 U.S.C. 154(b) by 0 days.

(21) Appl. No.: 18/533,579

(22) Filed: Dec. 8, 2023

(30) Foreign Application Priority Data

| Mar. 16, 2023 | (CN) | 202320525422.5 |
| Mar. 16, 2023 | (CN) | 202320525589.1 |
| Mar. 16, 2023 | (CN) | 202320526008.6 |
| Jul. 11, 2023 | (CN) | 202321818332.1 |
| Jul. 13, 2023 | (CN) | 202321850106.1 |

(51) Int. Cl.
 *G01K 1/024* (2021.01)
 *G01K 1/12* (2006.01)

(52) U.S. Cl.
 CPC .............. *G01K 1/024* (2013.01); *G01K 1/12* (2013.01); *G01K 2207/06* (2013.01); *G01K 2215/00* (2013.01)

(58) Field of Classification Search
 CPC ............. G01K 13/00; G01K 2207/02; G01K 2215/00; A47J 37/0786; A47J 2202/00; A47J 36/321; G08C 17/02
 See application file for complete search history.

(56) References Cited

U.S. PATENT DOCUMENTS

| 2019/0041271 A1* | 2/2019 | Preston | G01K 1/026 |
| 2020/0096393 A1* | 3/2020 | Lion | G01K 3/10 |
| 2020/0141813 A1* | 5/2020 | Nivala | G01K 13/00 |

* cited by examiner

*Primary Examiner* — Brandi N Hopkins
*Assistant Examiner* — Janice M Soto
(74) *Attorney, Agent, or Firm* — Westbridge IP LLC

(57) ABSTRACT

A food thermometer includes a thermometer housing, a temperature sensor, a communication circuit and an antenna. The thermometer housing comprises a probe portion and a handle portion connected to one end of the probe portion, and at least part of the probe portion is to be inserted into food; the handle portion is an insulator, at least part of the probe portion has a metal structure; and the temperature sensor is arranged in the thermometer housing and configured to sense and obtain temperature information, the communication circuit is electrically connected to the temperature sensor and configured to transmit the temperature information to the outside through the antenna, the antenna is arranged at the handle portion and insulated, and spaced apart, from the probe portion, the communication circuit is arranged in the handle portion and connected to the antenna.

18 Claims, 21 Drawing Sheets

FOOD THERMOMETER, REPEATER AND FOOD THERMOMETER ASSEMBLY

CROSS-REFERENCE TO RELATED APPLICATIONS

The present application claims priority to Chinese Patent Application No. 202320525422.5, filed on Mar. 16, 2023, and entitled "FOOD THERMOMETER"; Chinese Patent Application No. 202321818332.1, filed on Jul. 11, 2023, and entitled "FOOD THERMOMETER AND FOOD THERMOMETER ASSEMBLY"; Chinese Patent Application No. 202320525589.1, filed on Mar. 16, 2023, and entitled "FOOD THERMOMETER"; Chinese Patent Application No. 202321850106.1, filed on Jul. 13, 2023, and entitled "REPEATER AND FOOD THERMOMETER ASSEMBLY"; and Chinese Patent Application No. 202320526008.6, filed on Mar. 16, 2023, and entitled "REPEATER". All of the aforementioned applications are incorporated herein by reference in their entireties.

TECHNICAL FIELD

The present disclosure relates to the field of thermometer, in particular to a food thermometer, a repeater and a food thermometer assembly.

BACKGROUND

A food thermometer is a type of kitchen thermometer. Usually, the food thermometer needs to be inserted into the food to be cooked, so as to obtain the food temperature in real time during a cooking process.

The use experience needs to be improved for the existing food thermometer and supporting repeater.

SUMMARY

In a first aspect, embodiments of the present disclosure provide a food thermometer, including a thermometer housing, a temperature sensor, a communication circuit and an antenna. The thermometer housing includes a probe portion and a handle portion connected to one end of the probe portion, and at least part of the probe portion is to be inserted into food. The handle portion is an insulator, at least part of the probe portion has a metal structure. The temperature sensor is arranged in the thermometer housing and configured to sense and obtain temperature information, the communication circuit is electrically connected to the temperature sensor and configured to transmit the temperature information to the outside through the antenna. The antenna is arranged at the handle portion and insulated, and spaced apart, from the probe portion, the communication circuit is arranged in the handle portion and connected to the antenna.

According to the embodiments of the present disclosure, the food thermometer further includes a main control board arranged in the thermometer housing, the temperature sensor and the communication circuit are electrically connected to the main control board.

According to the embodiments of the present disclosure, the food thermometer further includes a heat-insulation fixing member arranged in the handle portion, the heat-insulation fixing member wraps the communication circuit and the communication circuit is fixedly connected to an inner wall of the handle portion through the heat-insulation fixing member.

According to the embodiments of the present disclosure, the communication circuit is arranged separately from the main control board, and the main control board is located in the probe portion.

According to the embodiments of the present disclosure, the communication circuit is integrated on the main control board, the main control board includes a first part located in the probe portion and a second part extending into the handle portion, and the communication circuit is located on the second part.

According to the embodiments of the present disclosure, the heat-insulation fixing member wraps the second part and the second part is fixedly connected to the inner wall of the handle portion through the heat-insulation fixing member.

According to the embodiments of the present disclosure, the antenna is disposed at an end of the handle portion away from the probe portion.

According to the embodiments of the present disclosure, the antenna is arranged on a circumferential wall of the handle portion.

According to the embodiments of the present disclosure, the temperature sensor includes a first temperature sensor and a second temperature sensor, the first temperature sensor is disposed in the probe portion, and the second temperature sensor is disposed in the handle portion.

According to the embodiments of the present disclosure, the first temperature sensor is in contact with the probe portion to sense internal temperature of the food through the probe portion, and the second temperature sensor is in contact with the antenna to sense ambient temperature through the antenna.

According to the embodiments of the present disclosure, the food thermometer further includes a power storage element arranged in the probe portion, the power storage element is electrically connected to the main control board, a first charging contact and a second charging contact that are electrically connected to the power storage element through the main control board, where at least one of the first charging contact or the second charging contact is arranged at the probe portion.

According to the embodiments of the present disclosure, the probe portion includes a first probe section adjacent to the handle portion and a second probe section located on a side of the first probe section away from the handle portion, the second probe section has a metal structure, at least part of a wall surface of the first probe section is set as an insulation member, at least one of the first charging contact or the second charging contact is arranged on the insulation member.

According to the embodiments of the present disclosure, the first charging contact is arranged on the insulation member, and the second charging contact is arranged on the handle portion.

According to the embodiments of the present disclosure, the first charging contact and the second charging contact are arranged on the insulating member.

According to the embodiments of the present disclosure, at least one of the first charging contact or the second charging contact has an annular structure circumferentially surrounding the thermometer housing.

In a second aspect, embodiments of the present disclosure provide a food thermometer, including a thermometer housing. The thermometer housing includes a probe portion, a first partition, an antenna portion, a second partition and an end portion which are connected sequentially, the probe portion has a metal structure, and at least part of the probe portion is to be inserted into food, the antenna portion has a metal structure and serves as a handle portion, and the first partition and the second partition are each an insulation and heat-resistant member.

According to the embodiments of the present disclosure, the first partition and the second partition are each a ceramic member.

According to the embodiments of the present disclosure, the probe portion, the first partition, the antenna portion, the second partition and the end portion are connected into a one-piece structure.

According to the embodiments of the present disclosure, the end portion is an insulation member, and the food thermometer further comprises a charging connection point disposed on an end surface of the end portion away from the probe portion.

According to the embodiments of the present disclosure, the food thermometer further includes an integrated circuit disposed in the thermometer housing, the antenna portion and the charging connection point are electrically connected to the integrated circuit, and the integrated circuit is capable of communicating with the outside through the antenna portion.

According to the embodiments of the present disclosure, the food thermometer further includes a first temperature sensor disposed in the probe portion and in contact with the probe portion. The first temperature sensor is electrically connected to the integrated circuit, and the first temperature sensor is used to obtain internal temperature of the food through heat conduction of the probe portion.

According to the embodiments of the present disclosure, the food thermometer further includes a second temperature sensor disposed in the end portion and in contact with the charging connection point, the second temperature sensor is electrically connected to the integrated circuit, the second temperature sensor is used to obtain ambient temperature through heat conduction of the charging connection point.

According to the embodiments of the present disclosure, the end portion is a heat insulator.

According to the embodiments of the present disclosure, the food thermometer further includes a power storage element arranged in the probe portion, and the power storage element is electrically connected to the integrated circuit.

In a third aspect, embodiments of the present disclosure provide a food thermometer assembly, including the above-mentioned food thermometer and a repeater. The food thermometer is capable of communicating with the repeater through the antenna portion.

In a fourth aspect, embodiments of the present disclosure provide a food thermometer assembly, including a repeater and the above-mentioned food thermometer. The repeater includes a repeater housing, the repeater housing has a first surface and a second surface opposite to each other, the repeater housing includes a first protrusion and a second protrusion protruding relative to the first surface, the first protrusion and the second protrusion are spaced apart from each other, the first protrusion has a receiving groove extending through the first protrusion and facing an end surface of the second protrusion. The food thermometer includes the thermometer housing, the thermometer housing includes the probe portion and the handle portion connected to one end of the probe portion, and at least part of the probe portion is to be inserted into food. A width of the probe portion is less than or equal to a width of the receiving groove, and a width of the handle portion is greater than the width of the receiving groove. In case that the probe portion is placed in the receiving groove, the handle portion is clamped between the first protrusion and the second protrusion.

According to the embodiments of the present disclosure, the handle portion has a first end away from the probe portion, the food thermometer further includes a charging interface, at least part of the charging interface is disposed on an end surface of the first end, the repeater further includes a charging assembly, at least part of the charging assembly is disposed on the second protrusion.

According to the embodiments of the present disclosure, the repeater includes a charging circuit board, the charging assembly is disposed on the charging circuit board. In case that the probe portion is placed in the receiving groove, the charging circuit board is arranged parallel to the end surface of the first end, and the charging assembly is coupled with the charging interface to charge the food thermometer.

According to the embodiments of the present disclosure, the probe portion is conductive and the handle portion is insulated, the food thermometer further includes a power storage element, the power storage element includes a first electrode and a second electrode, the first electrode is electrically connected to the probe portion, the second electrode is electrically connected to the charging interface, and the probe portion is insulated, and spaced apart, from the charging interface.

According to the embodiments of the present disclosure, the charging assembly includes a first charging assembly and a second charging assembly, the first charging assembly is disposed on the first protrusion, and the second charging assembly is arranged at the second protrusion. In case that the probe portion is placed in the receiving groove, the first charging assembly is electrically connected to the probe portion, and the second charging assembly is electrically connected to the charging interface.

According to the embodiments of the present disclosure, the first charging assembly includes a first elastic guiding member and a first charging member, at least part of the first charging member extends into the receiving groove, the first charging member has a first contact surface matching an outer peripheral surface of the probe portion, the first elastic guiding member is installed in the housing, and the first charging member is connected to the first elastic guiding member. In case that the probe portion is placed in the receiving groove, the first elastic guiding member enables the first charging member to abut against the probe portion in a radial direction of the probe portion.

According to the embodiments of the present disclosure, the second charging assembly includes a second elastic guiding member and a second charging member, the second elastic guiding member is installed in the second protrusion, and the second charging member is connected to the second elastic guiding member. In case that the probe portion is placed in the receiving groove, the second elastic guiding member enables the second charging member to abut against the first end of the handle portion in an axial direction of the probe portion.

According to the embodiments of the present disclosure, the repeater further includes a battery compartment for accommodating a battery, the battery compartment is in the first protrusion and on a side of the receiving groove, and an extension direction of the battery compartment is the same with an extension direction of the receiving groove. The repeater further includes a sound-generating device disposed on the second surface.

According to the embodiments of the present disclosure, the quantity of receiving grooves is more than two, and two or more receiving grooves are arranged sequentially in the first protrusion.

According to the embodiments of the present disclosure, the first surface between the first protrusion and the second protrusion is a depressed portion, and a heat insulation layer is provided on a surface of the depressed portion and a surface of the receiving groove.

In a fifth aspect, embodiments of the present disclosure provide a repeater for the above-mentioned food thermometer, including a base body having a mounting surface, where an installation slot capable of accommodating the food thermometer is provided in the mounting surface; an electrical connecting member provided on a side wall of the installation slot, and in contact with the food thermometer to charge the food thermometer. The electrical connecting member has a buckle structure, the electrical connecting member is elastically stretchable relative to the side wall of the installation slot, and in case that the food thermometer is installed in the installation slot, the electrical connecting member is capable of fastening the food thermometer in the installation slot.

According to the embodiments of the present disclosure, the food thermometer includes the probe portion and the handle portion, the installation slot includes a first sub-slot and a second sub-slot that communicate with each other, the first sub-slot extends in a first direction in the mounting surface, the first sub-slot is used to accommodate at least part of the probe portion, the second sub-slot is connected to one end of the first sub-slot, and the second sub-slot is used to accommodate at least part of the handle portion.

According to the embodiments of the present disclosure, the electrical connecting member includes a first electrical connecting member and a second electrical connecting member, and one of the first electrical connecting member and the second electrical connecting member is connected to a positive charging electrode of the food thermometer, and the other thereof is connected to a negative charging electrode of the food thermometer; the first electrical connecting member and the second electrical connecting member are arranged in the first sub-slot and spaced apart from each other in the first direction.

According to the embodiments of the present disclosure, the first electrical connecting member and the second electrical connecting member each includes a pair of buckles, and buckles in each pair are correspondingly disposed on two opposite side walls of the first sub-slot.

According to the embodiments of the present disclosure, a width of the second sub-slot in the second direction is greater than a width of the first sub-slot in the second direction, and the second direction is perpendicular to the first direction and parallel to the mounting surface.

According to the embodiments of the present disclosure, a limiting protrusion is provided on a bottom wall of the second sub-slot, in case that the food thermometer is installed in the installation slot, one end of the food thermometer is capable of abutting against the limiting protrusion.

According to the embodiments of the present disclosure, the repeater further includes a cover body capable of covering the mounting surface. A concave cavity is provided on one side of the cover body facing the mounting surface, a clamping slot is provided in the concave cavity, and the clamping slot is capable of clamping the food thermometer, so that the food thermometer is fastened in the concave cavity.

According to the embodiments of the present disclosure, a button and an interface are provided on an outer surface of the base body, and a battery chamber is provided on a surface of the base body away from the mounting surface. The repeater further includes a circuit board located in the base body, and the electrical connecting member, the button, the interface and the battery chamber are electrically connected to the circuit board.

In a sixth aspect, embodiments of the present disclosure provide a food thermometer assembly, including the above-mentioned repeater and a food thermometer capable of being installed in the installation slot of the repeater and in contact with the electrical connecting member.

In a seventh aspect, embodiments of the present disclosure provide a repeater for a thermometer. The thermometer is charged through the repeater, the repeater includes a main circuit board including a control circuit and a power supply circuit, where the power supply circuit is electrically connected to the control circuit, the control circuit detects and controls the power supply circuit to charge the thermometer; a battery electrically connected to the main circuit board; and a housing. A power supply interface is provided on the housing, the power supply interface is electrically connected to the main circuit board, and the main circuit board receives external current through the power supply interface. The power supply circuit includes a power source circuit and a power supply switching circuit, the power source circuit is electrically connected to the control circuit, and the power source circuit converts current outputted by the battery or the power supply interface into stable power supply current. The power supply switching circuit is electrically connected to the power source circuit, the battery and the power supply interface, the power supply switching circuit includes a first field effect transistor, and the first field effect transistor enables the battery to be electrically connected to the power source circuit in case that the power supply interface does not receive external current, and enables the battery to be electrically disconnected from the power source circuit in case that the power supply interface receives external current.

According to the embodiments of the present disclosure, a display device is further provided on the housing, the display device is electrically connected to the control circuit, and the display device is capable of displaying power information of the battery and power information of the thermometer during charging.

According to the embodiments of the present disclosure, the power supply switching circuit further includes a first resistor, a first Schottky diode and a first capacitor, a first end of the first field effect transistor is connected to the battery, a second end of the first field effect transistor is electrically connected to the power source circuit, a control end of the first field effect transistor is electrically connected to the power supply interface, and the first field effect transistor is a P-channel field effect transistor. There is a first node between the control end of the first field effect transistor and the power supply interface, the first resistor is electrically connected to the first node and grounded, and the power supply interface, the first Schottky diode, a second node and the power source circuit are electrically connected sequentially; a first end of the first capacitor is electrically connected to the second node, and a second end of the first capacitor is grounded.

According to the embodiments of the present disclosure, the power source circuit includes a second resistor, a third resistor, a second Schottky diode, a second capacitor, a third capacitor, a fourth capacitor and a power source processor, a power source end of the power source processor is connected to the second node, a first end of the power source processor is electrically connected to a first end of the second capacitor, a second end of the power source processor is electrically connected to a second end of the second capacitor, an enable end of the power source processor is electrically connected to the second end of the first field effect transistor, a voltage output end of the power source processor is configured to output a voltage, and a ground end of the power source processor is grounded. A first end of the third capacitor is electrically connected to the power source end of the power source processor, and a second end of the third capacitor is grounded. The voltage output end of the power source processor, a third node, the third resistor, the second Schott diode are electrically connected sequentially, the second resistor and the third resistor are electrically connected in parallel, a first end of the fourth capacitor is electrically connected to the third node, and a second end of the fourth capacitor is grounded.

According to the embodiments of the present disclosure, the power supply circuit further includes a detection circuit electrically connected to the control circuit and the battery, the detection circuit detects an operating status of the main circuit board.

According to the embodiments of the present disclosure, the detection circuit includes a power supply detection circuit electrically connected to the control circuit and the power supply interface, the power supply detection circuit detects a potential of the power supply interface to obtain potential information, the control circuit generates power supply information based on the potential information and controls the display device to display the power supply information.

According to the embodiments of the present disclosure, the power supply detection circuit includes a fourth resistor and a fifth resistor, the first node, the fourth resistor, a fourth node, the fifth resistor are electrically connected sequentially, a second end of the fifth resistor is grounded, the fourth node is electrically connected to the control circuit, and the power supply detection circuit transmits a low-level signal to the control circuit in case that the power supply interface does not receive external current, and transmits a high-level signal to the control circuit in case that the power supply interface receives external current.

According to the embodiments of the present disclosure, the detection circuit further includes a charging detection circuit. The charging detection circuit is electrically connected to the control circuit, the charging detection circuit includes a second field effect transistor, a fifth capacitor, a sixth resistor, a seventh resistor, an eighth resistor, a ninth resistor and a tenth resistor, a first end of the second field effect transistor is grounded, a second end of the second field effect transistor is electrically connected to the control circuit, a control end of the second field effect transistor, the seventh resistor, the eighth resistor and a thermometer detection end are electrically connected sequentially, and the second field effect transistor is an N-channel field effect transistor. There is a fifth node between the second end of the second field effect transistor and the control circuit, a first end of the ninth resistor is electrically connected to the fifth node, and a second end of the ninth resistor is electrically connected to a power source voltage end of the control circuit. A first end of the tenth resistor is electrically connected to the fifth node, and a second end of the tenth resistor is electrically connected to a charging state end of the control circuit. There is a sixth node between the control end of the second field effect transistor and the seventh resistor, a first end of the sixth resistor is electrically connected to the sixth node, a second end of the sixth resistor is grounded, and the fifth capacitor is connected in parallel to the sixth resistor. The second field effect transistor generates a to-be-charged signal when the thermometer is low in power, and the control circuit generates to-be-charged information according to the to-be-charged signal and controls the display device to display the to-be-charged information. The second field effect transistor generates a full-charge signal when the thermometer is fully charged, and the control circuit generates full-charge information based on the full-charge signal and controls the display device to display the full-charge information.

According to the embodiments of the present disclosure, the detection circuit further includes a battery voltage detection circuit. The battery voltage detection circuit includes an eleventh resistor, a twelfth resistor and a sixth capacitor, there is a seventh node between the eleventh resistor and the twelfth resistor, a first end of the twelfth resistor is electrically connected to the battery, a second end of the twelfth resistor is electrically connected to the seventh node, a first end of the eleventh resistor is connected to the control circuit through the seventh node, a second end of the eleventh resistor is grounded, the sixth capacitor is connected in parallel to the eleventh resistor, and the battery voltage detection circuit is used to detect voltage information of the battery and send the voltage information to the control circuit.

According to the embodiments of the present disclosure, the display device is a display screen and/or an indicator, and the detection circuit further includes a charging indication circuit electrically connected to the control circuit, the charging indication circuit emits a corresponding prompt according to a charging status of the thermometer.

BRIEF DESCRIPTION OF THE DRAWINGS

In order to illustrate the technical solutions of the embodiments of the present disclosure or the prior art in a clearer manner, the drawings required for the description of the embodiments of the present disclosure or the prior art will be described hereinafter briefly. Apparently, the following drawings merely relate to some embodiments of the present disclosure, and based on these drawings, a person of ordinary skill in the art may obtain other drawings without any creative effort.

Figure 1:
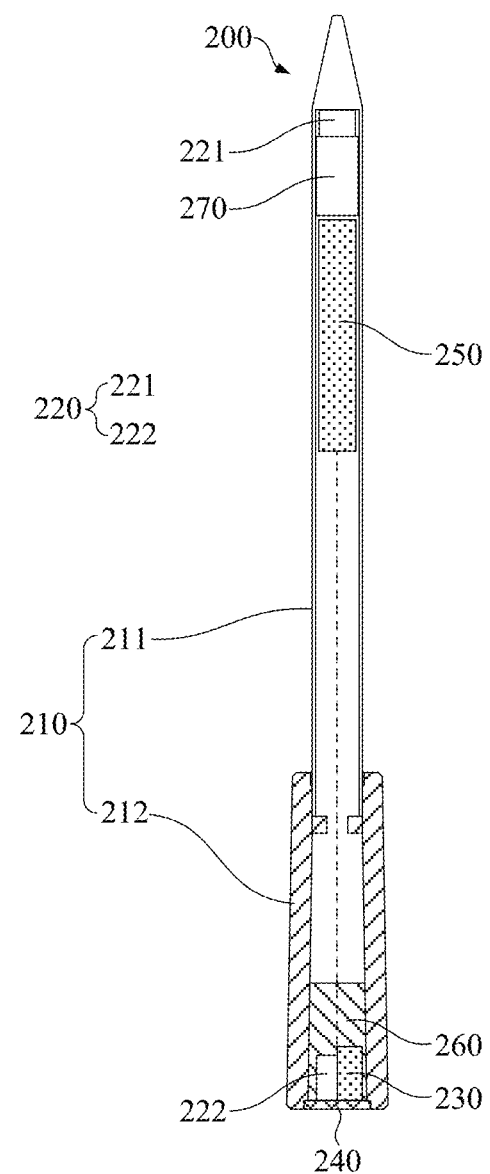
FIG. 1 is a schematic view showing a food thermometer according to a first embodiment of the present disclosure.

The realization of the objective, functional features and advantages of the present disclosure will be further described with reference to the embodiments and the accompanying drawings.

DETAILED DESCRIPTION OF THE EMBODIMENTS

The technical solutions in the embodiments of the present disclosure will be described hereinafter clearly with reference to the drawings of the embodiments of the present disclosure. Apparently, the following embodiments merely relate to a part of, rather than all of, the embodiments of the present disclosure, and based on these embodiments, a person of ordinary skill in the art may, without any creative effort, obtain other embodiments, which also fall within the scope of the present disclosure.

It is to be noted that all directional indications (such as on/above, under/below, left, right, front, back) in the embodiments of the present disclosure are merely used to explain a relative position relationship, a relative movement condition, etc. among members in a specific posture (as shown in the drawings), and the specific posture is changed, the directional indication will be changed too.

In the descriptions of the present disclosure, the terms such as "first" and "second" are merely used for illustrative purposes, but shall not be construed as indicating or implying relative importance or implicitly indicating the number of indicated technical features. Therefore, a feature defined with "first" or "second" may explicitly or implicitly includes at least one of the feature. Moreover, the technical solutions in various embodiments may be combined with each other based on that it is capable of being achieved by a person skilled in the art. When there is a conflict during the combination or a combination is not achieved by a person skilled in the art, it should be considered that such combination of the technical solutions is not existed and is not within the scope of the present invention.

FIG. 1 is a schematic view showing a food thermometer according to a first embodiment of the present disclosure. A food thermometer 200 includes a thermometer housing 210, a temperature sensor 220, a communication circuit 230 and an antenna 240. The thermometer housing 210 includes a probe portion 211 and a handle portion 212 connected to one end of the probe portion 211, and at least part of the probe portion 211 is to be inserted into food. The handle portion 212 is an insulator, at least part of the probe portion 211 has a metal structure. The temperature sensor 220 is arranged in the thermometer housing 210 and configured to sense and obtain temperature information, the communication circuit 230 is electrically connected to the temperature sensor 220 and configured to transmit the temperature information to the outside through the antenna 240.

In the embodiments of the present disclosure, the antenna 240 is arranged at the handle portion 212 and insulated, and spaced apart, from the probe portion 211, the communication circuit 230 is arranged in the handle portion 212, and the communication circuit 230 is connected to the antenna 240.

According to the food thermometer 200 in the embodiments of the present disclosure, the thermometer housing 210 of the food thermometer 200 includes the probe portion 211 and the handle portion 212. The handle portion 212 is an insulator, and the probe portion 211 has a metal structure. The antenna 240 is arranged at the handle portion 212 and insulated, and spaced apart, from the probe portion 211, the communication circuit 230 is arranged in the handle portion 212, and the communication circuit 230 is connected to the antenna 240. The temperature sensor 220 is capable of sensing and obtaining temperature information, the communication circuit 230 is capable of transmitting the temperature information to the outside through the antenna 240. In the food thermometer 200, the communication circuit 230 is arranged in the handle portion 212, so it is able for the communication circuit to be directly connected to the antenna 240 which is also provided in the handle portion 212. In this regard, it does not need to provide a long waveguide transmission structure in the food thermometer 200, so as to save a space inside the food thermometer 200. In addition, since a temperature signal will not be lost due to transmission in the relatively long waveguide transmission structure, it is able to improve the accuracy of the temperature signal being transmitted outward.

In the embodiments of the present disclosure, the food thermometer 200 further includes a main control board 250 arranged in the thermometer housing 210, the temperature sensor 220 and the communication circuit 230 are electrically connected to the main control board 250.

In the embodiments of the present disclosure, the food thermometer 200 further includes a heat-insulation fixing member 260 arranged in the handle portion 212, the heat-insulation fixing member 260 wraps the communication circuit 230 and the communication circuit 230 is fixedly connected to an inner wall of the handle portion 212 through the heat-insulation fixing member 260. The heat-insulation fixing member 260 may be made of an insulation material that can withstand high temperature and has low thermal conductivity, such as a ceramic material. In one example, an outer circumferential surface of the heat-insulation fixing member 260 matches a shape of an inner circumferential surface of the handle portion 212, and the heat-insulation fixing member 260 is connected to the handle portion 212, so as to fix a position of the heat-insulation fixing member 260. For example, the communication circuit 230 is inserted into the heat-insulation fixing member 260, and the communication circuit 230 is basically wrapped by the heat-insulation fixing member 260. In the embodiments of the present disclosure, when the heat-insulation fixing member 260 wraps the communication circuit 230, it means that the heat-insulation fixing member 260 mainly wraps the communication circuit 230 along a circumferential direction of the communication circuit 230. An interior of a wrapping structure formed by the heat-insulation fixing member 260 may be not fully closed. For example, the heat-insulation fixing member 260 is provided with an opening for an electrical connection line to pass through, so that the communication circuit 230 inside the heat-insulation fixing member 260 can communicate with other members outside the heat-insulation fixing member 260 through the opening.

By providing the heat-insulation fixing member 260, on the one hand, it is able to ensure a stable position of the communication circuit 230 inside the handle portion 212, thereby ensuring the stability of the electrical connection with other members. On the other hand, the heat-insulation fixing member 260 has a heat-insulation effect, when the food thermometer 200 is used in a process of cooking food, it is able to prevent the communication circuit 230 from being adversely affected by high temperature outside the handle portion 212, thereby the reliability of the food thermometer 200.

As shown in FIG. 1, in the embodiment of the present disclosure, the communication circuit 230 is arranged separately from the main control board 250, and the main control board 250 is located in the probe portion 211.

As shown in FIG. 1, in the embodiment of the present disclosure, the antenna 240 is disposed at an end of the handle portion 212 away from the probe portion 211.

In some embodiments of the present disclosure, the temperature sensor 220 includes a first temperature sensor 221 and a second temperature sensor 222, the first temperature sensor 221 is disposed in the probe portion 211, and the second temperature sensor 222 is disposed in the handle portion 212.

In this embodiment, the first temperature sensor 221 is in contact with the probe portion 211 to sense internal temperature of the food through the probe portion 211. The second temperature sensor 222 is in contact with the antenna 240 to sense ambient temperature through the antenna 240. In the above embodiment, the antenna 240 further serves as a heat conduction member when the second temperature sensor 222 senses the ambient temperature, so as to improve the accuracy of the second temperature sensor 222 in sensing the ambient temperature and prevent the second temperature sensor 222 from being exposed outside of the thermometer housing 210, thereby to ensure the sealing performance inside the thermometer housing 210.

In some embodiments of the present disclosure, the food thermometer 200 further includes a power storage element 270 arranged in the probe portion 211, the power storage element 270 is electrically connected to the main control board 250, so as to charge the main control board 250. In some embodiments, the power storage element270 is a supercapacitor. In some embodiments, the power storage element 270 is a lithium titanate battery or a lithium iron phosphate battery.

Figure 2:
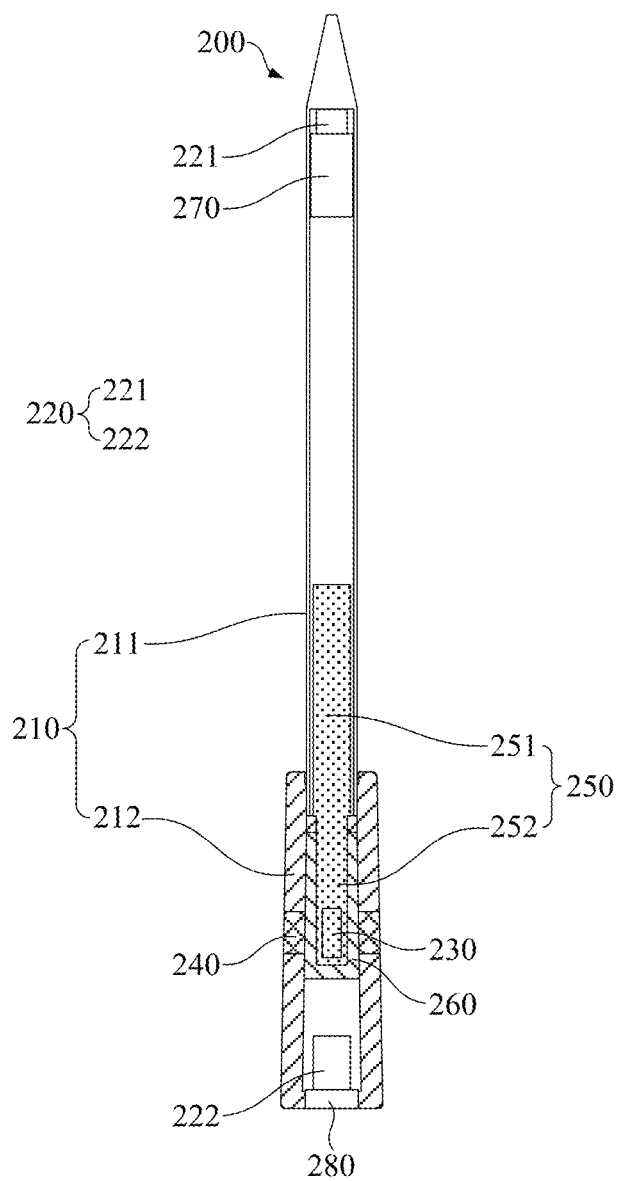
FIG. 2 is a schematic view showing a food thermometer according to a second embodiment of the present disclosure.

FIG. 2 is a schematic view showing a food thermometer according to a second embodiment of the present disclosure. A food thermometer 200 includes a thermometer housing 210, a temperature sensor 220, a communication circuit 230 and an antenna 240. The thermometer housing 210 includes a probe portion 211 and a handle portion 212 connected to one end of the probe portion 211, and at least part of the probe portion 211 is to be inserted into food. The handle portion 212 is an insulator, at least part of the probe portion 211 has a metal structure. The temperature sensor 220 is arranged in the thermometer housing 210 and configured to sense and obtain temperature information, the communication circuit 230 is electrically connected to the temperature sensor 220 and configured to transmit the temperature information to the outside through the antenna 240. The antenna 240 is arranged at the handle portion 212 and insulated, and spaced apart, from the probe portion 211. The communication circuit 230 is arranged in the handle portion 212, and the communication circuit 230 is connected to the antenna 240.

The food thermometer 200 may include a main control board 250 arranged in the thermometer housing 210, the temperature sensor 220 and the communication circuit 230 are electrically connected to the main control board 250.

In the embodiments of the present disclosure, the communication circuit 230 is integrated on the main control board 250. The main control board 250 includes a first part 251 located in the probe portion and a second part 252 extending into the handle portion, and the communication circuit 230 is located on the second part 252.

The food thermometer 200 further includes a heat-insulation fixing member 260 arranged in the handle portion 212, the heat-insulation fixing member 260 wraps the communication circuit 230 and the communication circuit 230 is fixedly connected to an inner wall of the handle portion 212 through the heat-insulation fixing member 260.

In this embodiment, the heat-insulation fixing member 260 wraps the second part 252 of the main control board 250, and the second part 252 is fixedly connected to the inner wall of the handle portion 212 through the heat-insulation fixing member 260. By providing the heat-insulation fixing member 260, on the one hand, it is able to ensure a stable position of the communication circuit 230 inside the handle portion 212, thereby ensuring the stability of the electrical connection with other members. On the other hand, the heat-insulation fixing member 260 has a heat-insulation effect, when the food thermometer 200 is used in a process of cooking food, it is able to prevent the communication circuit 230 and the second part 252 from being adversely affected by high temperature outside the handle portion 212.

In the embodiment of the present disclosure, the antenna 240 is arranged on a circumferential wall of the handle portion 212. Optionally, the antenna 240 is embedded in the circumferential wall of the handle portion 212 and extends from the inside of the handle portion 212 to the outside of the handle portion 212.

In the embodiment of the present disclosure, the temperature sensor 220 includes a first temperature sensor 221 and a second temperature sensor 222, the first temperature sensor 221 is disposed in the probe portion 211 and configured to sense the internal temperature of the food, and the second temperature sensor 222 is disposed in the handle portion 212 and configured to sense the ambient temperature.

In some embodiments, the food thermometer 200 may further include a heat conductive member 280 disposed at an end of the handle portion 212 away from the probe portion 211. The second temperature sensor 222 is in contact with the heat conductive member 280 to sense the ambient temperature through the heat conductive member 280.

According to the food thermometer 200 in the embodiments of the present application, the thermometer housing 210 of the food thermometer 200 includes the probe portion 211 and the handle portion 212. The handle portion 212 is an insulator, and the probe portion 211 has a metal structure. The antenna 240 is arranged at the handle portion 212 and insulated, and spaced apart, from the probe portion 211, the communication circuit 230 is arranged in the handle portion 212, and the communication circuit 230 is connected to the antenna 240. The temperature sensor 220 is capable of sensing and obtaining temperature information, the communication circuit 230 is capable of transmitting the temperature information to the outside through the antenna 240. The communication circuit 230 of the food thermometer 200 is arranged in the handle portion 212, so it is able for the communication circuit to be directly connected to the antenna 240 which is also provided in the handle portion 212. In this regard, it does not need to provide a long waveguide transmission structure in the food thermometer 200, so as to save a space inside the food thermometer 200. In addition, since a loss does not occur for a temperature signal due to transmission in the relatively long waveguide transmission structure, it is able to improve the accuracy of the temperature signal being transmitted outward.

Figure 3:
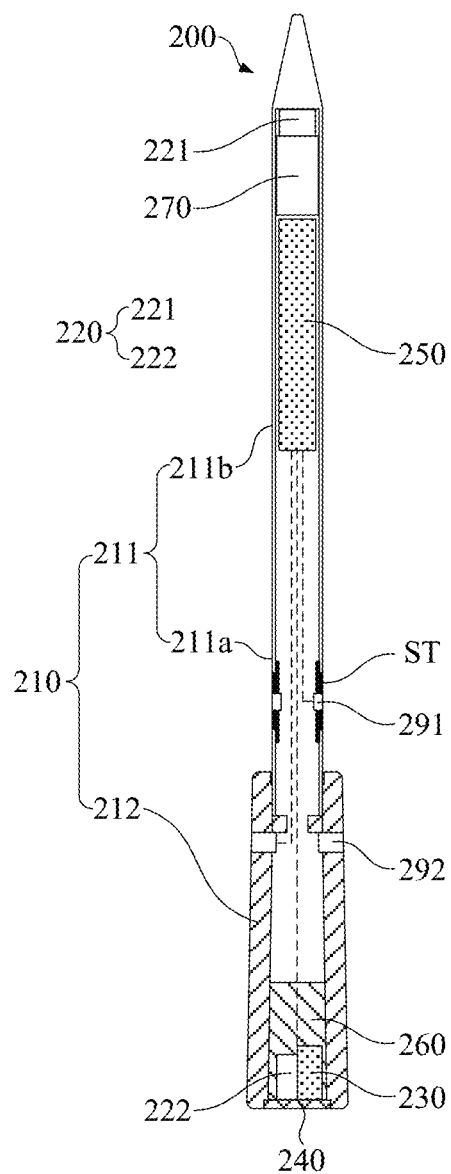
FIG. 3 is a schematic view showing a food thermometer according to a third embodiment of the present disclosure.

FIG. 3 is a schematic view showing a food thermometer according to a third embodiment of the present disclosure. The food thermometer 200 includes a thermometer housing 210, a temperature sensor 220, a communication circuit 230 and an antenna 240. Partial structures of the food thermometer 200 in the third embodiment is similar to those in the first embodiment. The differences between the two will be described below, and the similarities therebetween will not be described in detail.

The food thermometer 200 further includes a main control board 250 disposed in the thermometer housing 210, and the temperature sensor 220 and the communication circuit 230 are electrically connected to the main control board 250. In this embodiment, the food thermometer 200 further includes a power storage element 270, a first charging contact 291 and a second charging contact 292.

The power storage element 270 is arranged in the probe portion 211 and electrically connected to the main control board 250, so as to charge the main control board 250. In some embodiments, the power storage element 270 is a supercapacitor. In some embodiments, the power storage element 270 is a lithium titanate battery or a lithium iron phosphate battery.

The first charging contact 291 and the second charging contact 292 are electrically connected to the power storage element 270 through the main control board 250. One of the first charging contact 291 and the second charging contact 292 is connected to a positive charging electrode of the power storage element 270, and the other thereof is connected to a negative charging electrode of the power storage element 270. The first charging contact 291 and the second charging contact 292 are electrically connected to an external charging circuit, so as to charge the storage element 270. At least one of the first charging contact 291 or the second charging contact 292 is arranged at the probe portion 211. In some embodiments, the food thermometer 200 is cooperated with a charging box for use. In a case that the food thermometer 200 is stored in the charging box, the probe portion 211 of the food thermometer 200 is usually fastened in a storage structure of the charging box, so as to ensure that a relative position of the probe portion 211 in the charging box is relatively stable. In the embodiment of the present disclosure, at least one of the first charging contact 291 or the second charging contact 292 is arranged at the probe portion 211, so that when the food thermometer 200 is in a charging state, a charging circuit of the charging box is connected to at least one charging contact at the probe portion 211, thereby to improve the stability of the electrical connection of the food thermometer 200 in the charging state.

As shown in FIG. 3, in this embodiment, the probe portion 211 includes a first probe section 211a adjacent to the handle portion 212 and a second probe section 211b on a side of the first probe section 211a away from the handle portion 212, the second probe section 211b has a metal structure, at least part of a wall surface of the first probe section 211a is set as an insulation member ST, at least one of the first charging contact 291 or the second charging contact 292 is arranged on the insulation member ST. By providing the insulation member ST, it is able to prevent the charging contact on the insulation member ST from being electrically connected to other metal structures of the probe portion 211, thereby ensuring the reliability of the charging function of the charging contact.

In some embodiments, in the probe portion 211, the insulation member ST is connected to a metal structure around the insulation member ST in a sealed manner. For example, the insulation member ST and the metal structure around the insulation member ST are formed into a one-piece structure, so as to prevent moisture outside the probe portion 211 from entering the interior of the probe portion 211.

As shown in FIG. 3, in this embodiment, the first charging contact 291 is arranged on the insulation member ST, and the second charging contact 292 is arranged on the handle portion 212. The food thermometer 200 is cooperated with the charging box for use, in a case that the food thermometer 200 is stored in the charging box, one electrode of the charging circuit in the charging box is electrically connected to the first charging contact 291 on the probe portion 211, and another electrode of the charging circuit in the charging box is electrically connected to the second charging contact 292 on the handle portion 212, so as to charge the food thermometer 200.

In some embodiments, the first charging contact 291 may be provided on the probe portion 211, and the second charging contact 292 may be provided on the front or rear side of which the antenna 240 is located at on the handle portion 212.

In some embodiments, at least one of the first charging contact 291 or the second charging contact 292 has an annular structure circumferentially surrounding the thermometer housing 210. In the embodiment of the present disclosure, the insulation member ST has an annular structure circumferentially surrounding the thermometer housing 210, both the first charging contact 291 and the second charging contact 292 have an annular structure circumferentially surrounding the thermometer housing 210, and the first charging contact 291 is in the middle region of the insulation member ST. At least one of the first charging contact 291 or the second charging contact 292 has an annular structure circumferentially surrounding the thermometer housing 210, in a case where the food thermometer 200 needs to be charged, at least one of the first charging contact 291 and the second charging contact 292 can be electrically connected to an external charging circuit at any angle in a circumferential direction of the food thermometer 200, thereby improving the convenience of charging the food thermometer 200. In some other embodiments, the first charging contact 291 and the second charging contact 292 are not limited to the annular structure, and may also be in other shapes.

Figure 4:
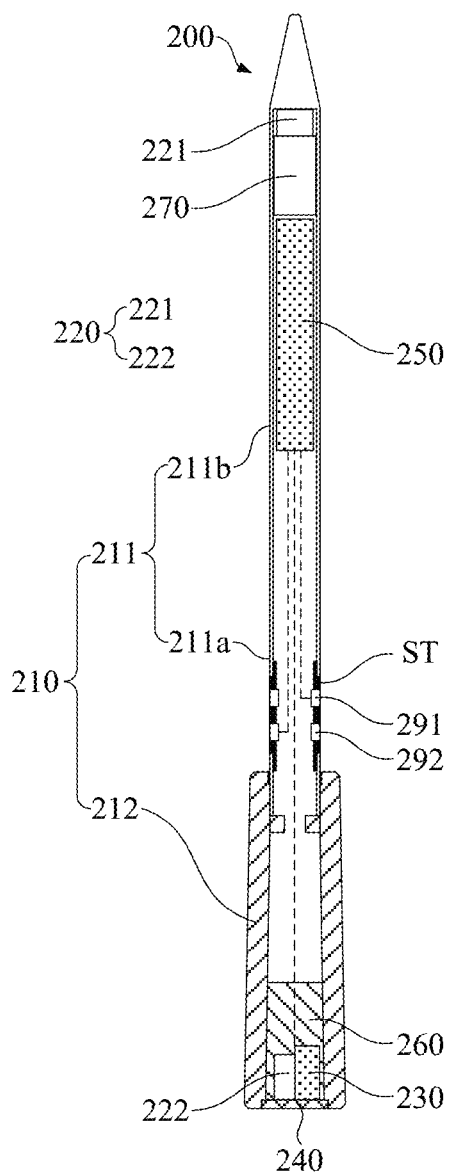
FIG. 4 is a schematic view showing a food thermometer according to a fourth embodiment of the present disclosure.

FIG. 4 is a schematic view showing a food thermometer according to a fourth embodiment of the present disclosure. The food thermometer 200 includes a thermometer housing 210, a temperature sensor 220, a communication circuit 230, an antenna 240, a main control board 250, a power storage element 270, a first charging contact 291 and a second charging contact. Partial structures of the food thermometer 200 in the fourth embodiment are similar to those in the third embodiment. The differences between the two will be described below, and the similarities therebetween will not be described in detail.

The probe portion 211 includes a first probe section 211a adjacent to the handle portion 212 and a second probe section 211b on a side of the first probe section 211a away from the handle portion 212, the second probe section 211b has a metal structure, at least part of a wall surface of the first probe section 211a is set as an insulation member ST.

In this embodiment, the first charging contact 291 and the second charging contact 292 are arranged on the insulation member ST. The food thermometer 200 is cooperated with the charging box for use, in a case that the food thermometer 200 is stored in the charging box, two electrodes of the charging circuit in the charging box are electrically connected to the first charging contact 291 and the second charging contact 292 respectively, so as to charge the food thermometer 200.

Figure 5:
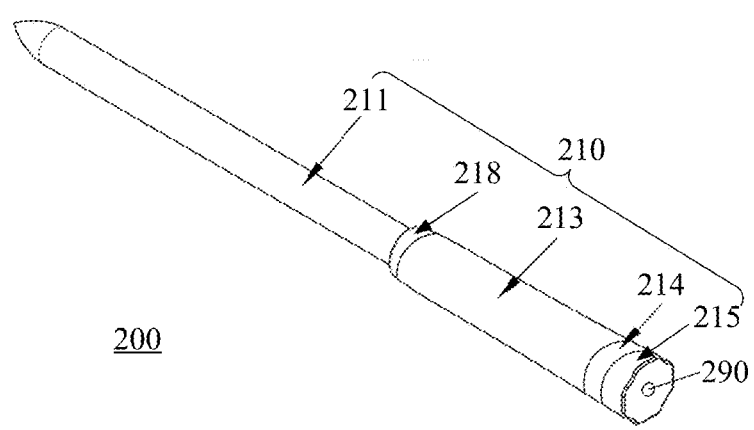
FIG. 5 is a solid view of the food thermometer according to an embodiment of the present disclosure.

FIG. 5 is a solid view of the food thermometer according to an embodiment of the present disclosure. A food thermometer 200 includes a thermometer housing 210. The thermometer housing 210 includes a probe portion 211, a first partition 218, an antenna portion 213, a second partition 214 and an end portion 215 which are connected sequentially. The probe portion has a metal structure, and at least part of the probe portion is to be inserted into food. In some embodiments, the probe portion 211 has a tip structure, so as to facilitate that the probe portion 211 is inserted into food. The antenna portion 213 has a metal structure and serves as a handle portion. For example, the antenna portion 213 is made of stainless steel. The first partition 218 and the second partition 214 are each an insulation and heat-resistant member.

According to the food thermometer 200 in the embodiment of the present disclosure, the thermometer housing 210 includes the probe portion 211, the first partition 218, the antenna portion 213, the second partition 214 and the end portion 215 which are connected sequentially, the antenna portion 213 has a metal structure and serves as the handle portion, so that the antenna structure and the handle operating portion of the food thermometer 200 are formed as one-piece without additional arrangements for the antenna, thereby simplifying the housing structure design of the food thermometer 200. The first partition 218 and the second partition 214 are each an insulation and heat-resistant member, so that two ends of the antenna portion 213 are insulated, and spaced apart, from other possible conductive parts of the thermometer housing 210, thereby to ensure the stability of the function of the antenna portion 213.

In some embodiments of the present disclosure, the first partition 218 and the second partition 214 are each a ceramic member. The ceramic member is a high-temperature-resistant ceramic member, so as to ensure the durability of the first partition 218 and the second partition 214. In other embodiments, the first partition 218 and the second partition 214 may be made of other high-temperature-resistant insulation materials, such as high-temperature-resistant glass, high-temperature-resistant polymer materials, etc.

In some embodiments of the present disclosure, the probe portion 211, the first partition 218, the antenna portion 218, the second partition 214 and the end portion 215 are connected into a one-piece structure. That is, the thermometer housing 210 has a one-piece structure, so as to ensure good sealing performance of the thermometer housing 210 and prevent moisture from entering the thermometer housing 210 during use.

In some embodiments of the present disclosure, the end portion 215 is an insulation member, and the food thermometer 200 further comprises a charging connection point 290 disposed on an end surface of the end portion 215 away from the probe portion 211. When the charging connection point 290 is electrically connected to an external circuit, it is able to charge the food thermometer 200 and replenish power to the food thermometer 200, thereby to ensure that the food thermometer 200 has a long battery life.

Figure 6:
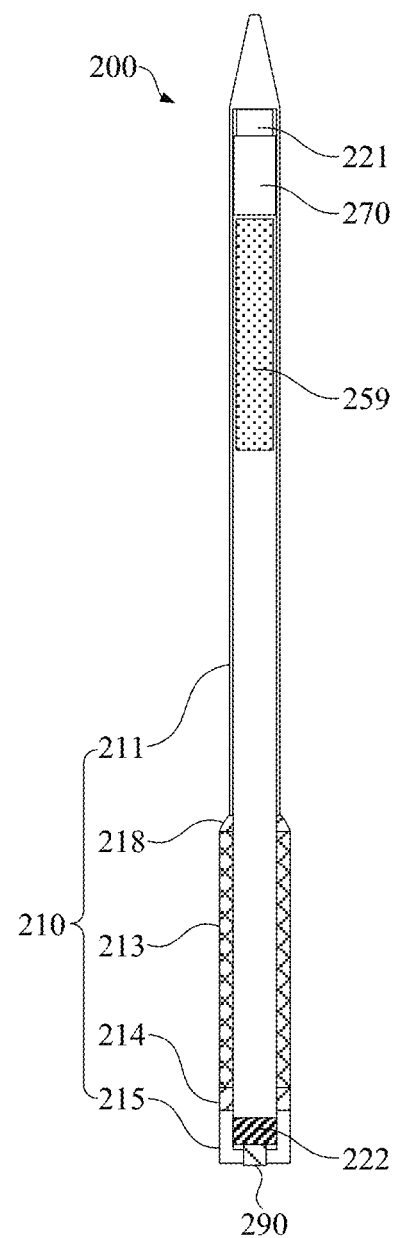
FIG. 6 is a sectional view of the food thermometer according to an embodiment of the present disclosure.

FIG. 6 is a sectional view of the food thermometer according to an embodiment of the present disclosure. In some embodiments of the present disclosure, the food thermometer 200 further includes an integrated circuit 259 disposed in the thermometer housing 210, the antenna portion 213 and the charging connection point 290 are electrically connected to the integrated circuit 259, and the integrated circuit 259 is capable of communicating with the outside through the antenna portion 213. The integrated circuit 259 may include multiple functional units, such as a main control unit, a communication circuit, and the communication circuit is electrically connected to the antenna portion 213. In some embodiments, the antenna portion 213 is electrically connected to the integrated circuit 259 through a line.

In some embodiments of the present disclosure, the food thermometer 200 further includes a first temperature sensor 221 disposed in the probe portion 211 and in contact with the probe portion 211, the first temperature sensor 221 is electrically connected to the integrated circuit 259, and the first temperature sensor 221 is used to obtain internal temperature of the food through heat conduction of the probe portion 211.

In some embodiments of the present disclosure, the food thermometer 200 further includes a second temperature sensor 222 disposed in the end portion 215 and in contact with the charging connection point 290, the second temperature sensor 222 is electrically connected to the integrated circuit 259, the second temperature sensor 222 is used to obtain ambient temperature through heat conduction of the charging connection point 290.

The internal temperature of the food obtained by the first temperature sensor 221 and the ambient temperature obtained by the second temperature sensor 222 can be transmitted to the outside via the antenna portion 213 under the control of the integrated circuit 259.

In some embodiments of the present disclosure, the end portion 215 is a heat insulator. The heat insulator may be made of a material whose thermal conductivity is significantly lower than that of the antenna portion 213 and the probe portion 211. The end portion 215 is configured as a heat insulator, it is able to reduce the mutual conduction between heat at the end portion 215 and heat at the probe portion 211, so as to reduce the interference of the internal temperature of the food on the sensing of the second temperature sensor 222, thereby increasing the detection accuracy of the ambient temperature.

In some embodiments of the present disclosure, the food thermometer 200 further includes a power storage element 270 arranged in the probe portion 211, and the power storage element 270 is electrically connected to the integrated circuit 259. The power storage element 270 is used to store electrical energy. In some embodiments, the power storage element 270 is electrically connected to the charging connection point 290, so as to charge the power storage element 270 through the charging connection point 290.

Embodiments of the present disclosure further provides a food thermometer assembly, which includes the food thermometer 200 in any of the above-mentioned embodiments and a repeater. The food thermometer 200 can communicate with the repeater through the antenna portion 213. The repeater can also communicate with a terminal device, thereby realizing communication between the food thermometer 200 and the terminal device.

The food thermometer 200 includes a thermometer housing 210. The thermometer housing 210 includes a probe portion 211, a first partition 218, an antenna portion 213, a second partition 214 and an end portion 215 which are connected sequentially. The probe portion has a metal structure, and at least part of the probe portion is to be inserted into food. In some embodiments, the probe portion 211 has a tip structure, so as to facilitate that the probe portion 211 is inserted into food. The antenna portion 213 has a metal structure and serves as a handle portion. For example, the antenna portion 213 is made of stainless steel. The first partition 218 and the second partition 214 are each an insulation and heat-resistant member.

According to the food thermometer assembly in the embodiment of the present disclosure, the thermometer housing 210 of the food thermometer 200 includes the probe portion 211, the first partition 218, the antenna portion 213, the second partition 214 and the end portion 215 which are connected sequentially, the antenna portion 213 has a metal structure and serves as the handle portion, so that the antenna structure and the handle operating portion of the food thermometer 200 are formed as one-piece without additional arrangements for the antenna, thereby simplifying the housing structure design of the food thermometer 200. The first partition 218 and the second partition 214 are each an insulation and heat-resistant member, so that two ends of the antenna portion 213 are insulated, and spaced apart, from other possible conductive parts of the thermometer housing 210, thereby to ensure the stability of the function of the antenna portion 213.

Figure 7:
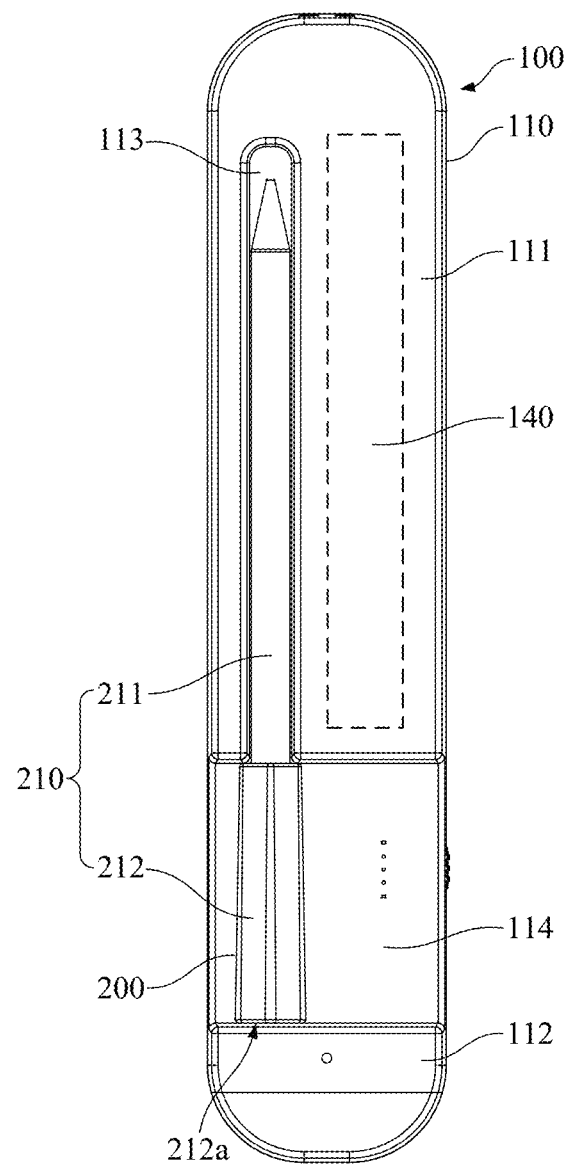
FIG. 7 is a top view of a food thermometer assembly according to an embodiment of the present disclosure.
Figure 8:
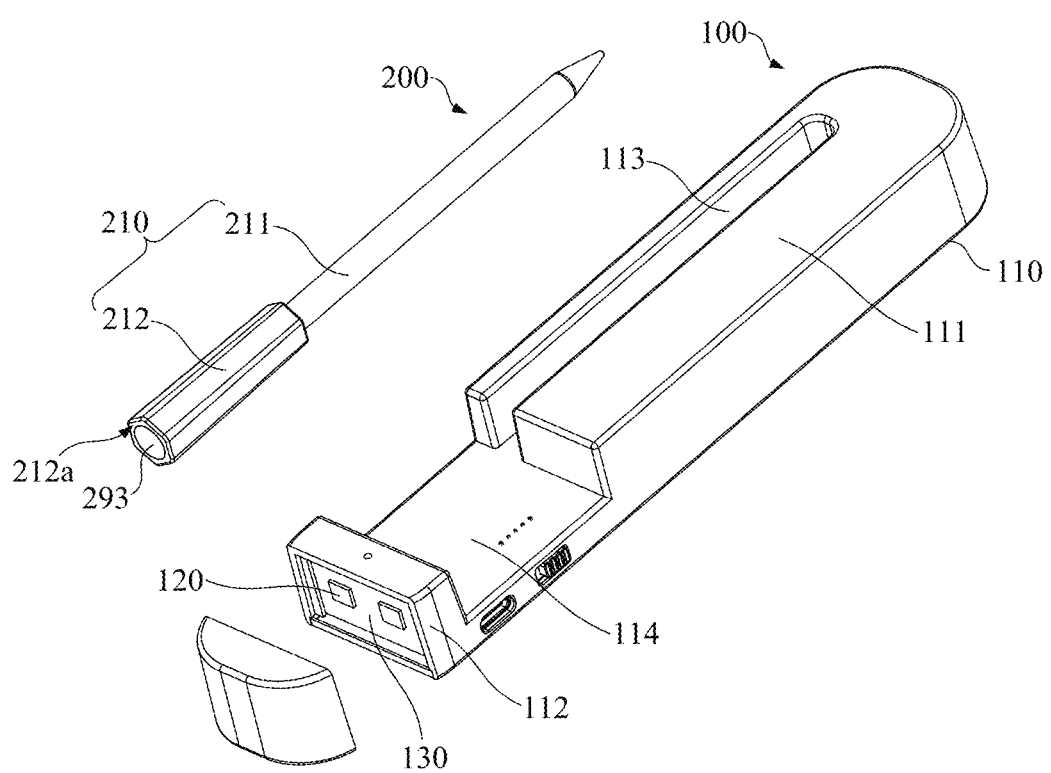
FIG. 8 is an exploded view of the food thermometer assembly according to an embodiment of the present disclosure.

FIG. 7 is a top view of a food thermometer assembly according to an embodiment of the present disclosure, FIG. 8 is an exploded view of the food thermometer assembly according to the embodiment of the present disclosure. The food thermometer assembly includes a repeater 100 and a food thermometer 200.

The repeater 100 includes a repeater housing 110, the repeater housing 110 has a first surface S1 and a second surface S2 opposite to each other. The repeater housing 110 includes a first protrusion 111 and a second protrusion 112 protruding relative to the first surface S1, the first protrusion 111 and the second protrusion are spaced apart from each other. The first protrusion 111 has a receiving groove 113 extending through the first protrusion 111 and facing an end surface of the second protrusion 112.

The food thermometer 200 includes a thermometer housing 210, the thermometer housing 210 includes a probe portion 211 and a handle portion 212 connected to one end of the probe portion 211, and at least part of the probe portion 211 is to be inserted into food. A width of the probe portion 211 is less than or equal to a width of the receiving groove 113, and a width of the handle portion 212 is greater than the width of the receiving groove 113. In case that the probe portion 211 is placed in the receiving groove 113, the handle portion 212 is clamped between the first protrusion 111 and the second protrusion 112.

In FIG. 7, the food thermometer assembly is in a state where the food thermometer 200 is stored in the repeater 100. According to the food thermometer assembly in the embodiment of the present disclosure, the repeater housing 110 includes the first protrusion 111 and the second protrusion 112 protruding relative to the first surface S1, the first protrusion 111 and the second protrusion are spaced apart from each other, the first protrusion 111 has a receiving groove 113 extending through the first protrusion 111 and facing an end surface of the second protrusion 112. The thermometer housing 210 includes the probe portion 211 and the handle portion 212, and the width of the handle portion 212 is greater than the width of the receiving groove 113, in case that the probe portion 211 is placed in the receiving groove 113, the handle portion 212 is clamped between the first protrusion 111 and the second protrusion 112. Therefore, when the food thermometer 200 is stored in the repeater 100, the food thermometer 200 is secured in an axial direction of the food thermometer 200 by the first protrusion 111 and the second protrusion 112 and secured in a radial direction of the food thermometer 200 through the receiving groove 113, thereby to improve the stability of the food thermometer 200 when it is stored in the repeater 100. In addition, the first protrusion 111 and the second protrusion are spaced apart from each other, so as to provide a space for holding the handle portion 212 on an outer peripheral surface of the handle portion 212, thereby to improve the convenience of placing the food thermometer 200 into the repeater 100 or taking out the food thermometer 200 from the repeater 100.

In some embodiments of the present disclosure, the handle portion 212 has a first end 212a away from the probe portion 211, the food thermometer 200 further includes a charging interface 293, at least part of the charging interface 293 is disposed on an end surface of the first end 212a, the repeater 100 further includes a charging assembly 120, at least part of the charging assembly 120 is disposed on the second protrusion 112. In the case where the food thermometer 200 is stored in the repeater 100, at least part of the charging assembly 120 can correspond to at least part of the charging interface 293, thereby improving the connection stability when the food thermometer 200 is charged on the repeater 100.

In this embodiment, the repeater 100 includes a charging circuit board 130, the charging assembly 120 is disposed on the charging circuit board 130. In case that the probe portion 211 is placed in the receiving groove 113, the charging circuit board 130 is arranged parallel to the end surface of the first end 212a, and the charging assembly 120 is coupled with the charging interface 293 to charge the food thermometer 200.

In some embodiments of the present disclosure, the repeater 100 further includes a battery compartment 140 for accommodating a battery, the battery compartment 140 is in the first protrusion 111 and on a side of the receiving groove 113, and an extension direction of the battery compartment 140 is the same with an extension direction of the receiving groove 113. The battery compartment 140 is arranged in a space of the first protruding part 111 on the side of the receiving groove 113, so as to save space, thereby to make the repeater 100 more compact.

The first surface S1 between the first protrusion 111 and the second protrusion 112 is a depressed portion 114. In some embodiments, a heat insulation layer is provided on a surface of the depressed portion 114 and a surface of the receiving groove 113, so it is able to avoid a high temperature damage for members of the repeater 100 caused by remaining heat of the used food thermometer 200.

Figure 9:
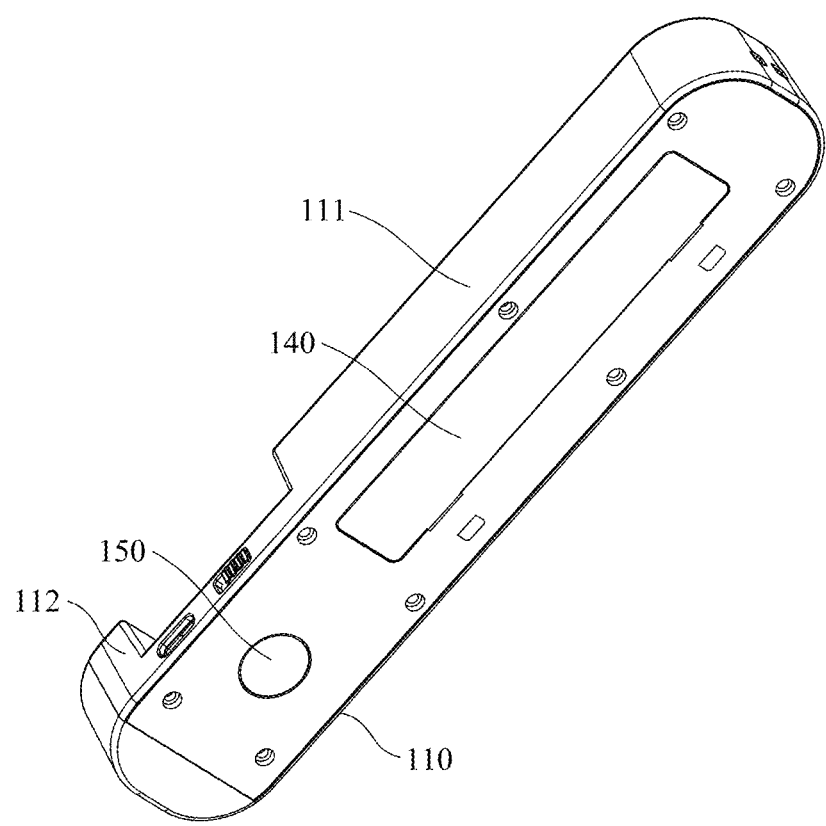
FIG. 9 is an exploded view of a repeater in the food thermometer assembly according to an embodiment of the present disclosure.

FIG. 9 is an exploded view of a repeater in the food thermometer assembly according to an embodiment of the present disclosure. In some embodiments, the repeater 100 further includes a sound-generating device 150 disposed on the second surface S2.

Figure 10:
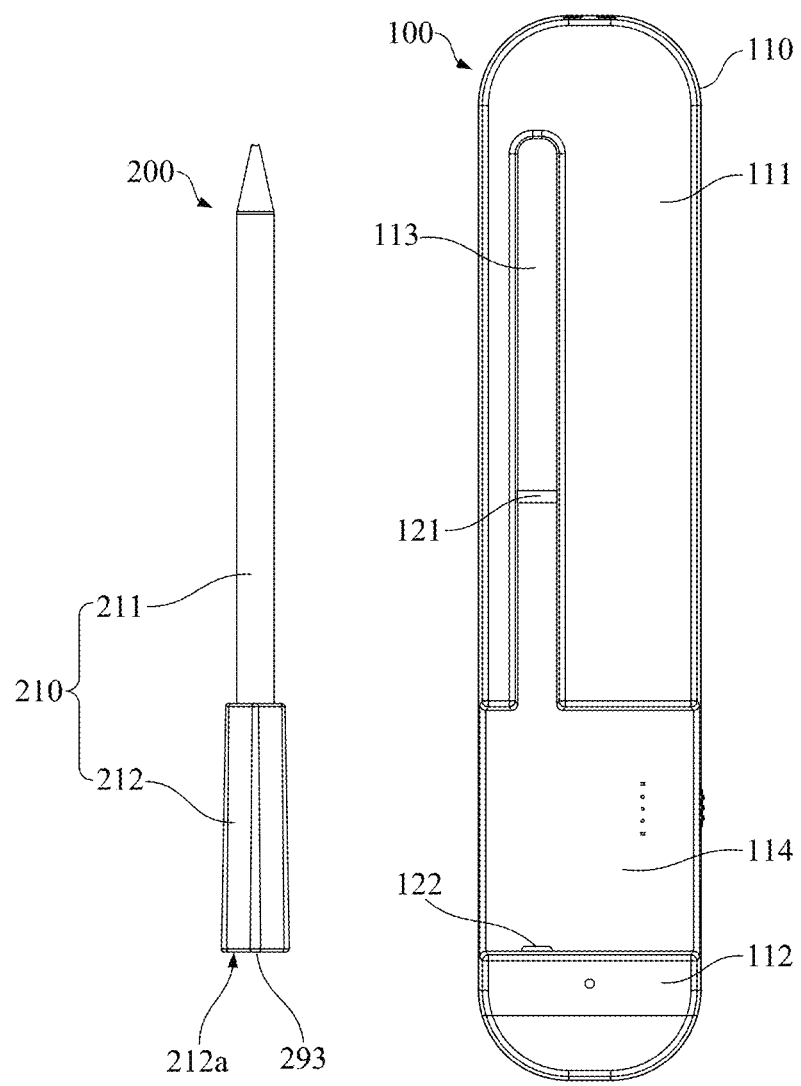
FIG. 10 is another top view of the food thermometer assembly according to an embodiment of the present disclosure.

FIG. 10 is another top view of the food thermometer assembly according to an embodiment of the present disclosure. The food thermometer assembly includes a repeater 100 and a food thermometer 200. The repeater 100 includes a repeater housing 110. The repeater housing 110 has a first surface S1 and a second surface S2 opposite to each other. The repeater housing 110 includes a first protrusion 111 and a second protrusion 112 protruding relative to the first surface S1, the first protrusion 111 and the second protrusion are spaced apart from each other. The first protrusion 111 has a receiving groove 113 extending through the first protrusion 111 and facing an end surface of the second protrusion 112. The food thermometer 200 includes a thermometer housing 210, the thermometer housing 210 includes a probe portion 211 and a handle portion 212 connected to one end of the probe portion 211, and at least part of the probe portion 211 is to be inserted into food. A width of the probe portion 211 is less than or equal to a width of the receiving groove 113, and a width of the handle portion 212 is greater than the width of the receiving groove 113. In case that the probe portion 211 is placed in the receiving groove 113, the handle portion 212 is clamped between the first protrusion 111 and the second protrusion 112.

The handle portion 212 has a first end 212a away from the probe portion 211, the food thermometer 200 further includes a charging interface 293, at least part of the charging interface 293 is disposed on an end surface of the first end 212a, the repeater 100 further includes a charging assembly 120, at least part of the charging assembly 120 is disposed on the second protrusion 112. In the case where the food thermometer 200 is stored in the repeater 100, at least part of the charging assembly 120 can correspond to at least part of the charging interface 293, thereby improving the connection stability when the food thermometer 200 is charged on the repeater 100.

In FIG. 10, the food thermometer assembly is in a state where the food thermometer 200 is not stored in the repeater 100. In some embodiments of the present disclosure, the probe portion 211 is conductive and the handle portion 212 is insulated, the food thermometer 200 further includes a power storage element. In some embodiments, the power storage element is a supercapacitor, a lithium titanate battery or a lithium iron phosphate battery. The power storage element includes a first electrode and a second electrode, the first electrode is electrically connected to the probe portion 211, the second electrode is electrically connected to the charging interface 293, and the probe portion 211 is insulated, and spaced apart, from the charging interface 293.

When the food thermometer 200 needs to be charged, the repeater 100 is electrically connected to the charging interface 293, so as to realize charging of the power storage element.

In some embodiments of the present disclosure, the charging assembly 120 includes a first charging assembly 121 and a second charging assembly 122, the first charging assembly 121 121 is disposed on the first protrusion 111, and the second charging assembly 122 is arranged at the second protrusion 112. In case that the probe portion 211 is placed in the receiving groove 113, the first charging assembly 121 is electrically connected to the probe portion 211, and the second charging assembly 122 is electrically connected to the charging interface 293.

Figure 11:
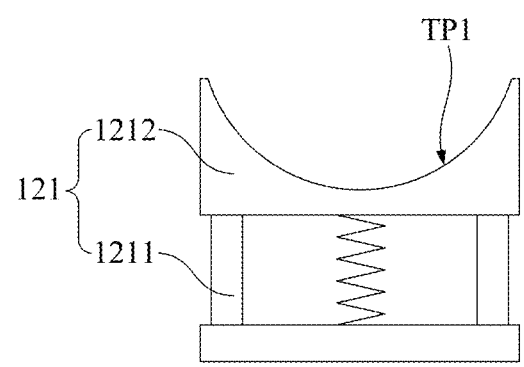
FIG. 11 is a schematic view showing a first charging assembly in the food thermometer assembly according to an embodiment of the present disclosure.

FIG. 11 is a schematic view showing a first charging assembly in the food thermometer assembly according to an embodiment of the present disclosure. In this embodiment, the first charging assembly 121 includes a first elastic guiding member 1211 and a first charging member 1212, at least part of the first charging member 1212 extends into the receiving groove, the first charging member 1212 has a first contact surface TP1 matching an outer peripheral surface of the probe portion 211, the first elastic guiding member 1211 is installed in the housing, and the first charging member 1212 is connected to the first elastic guiding member 1211. In case that the probe portion 211 is placed in the receiving groove 113, the first elastic guiding member 1211 enables the first charging member 1212 to abut against the probe portion 211 in a radial direction of the probe portion 211. Therefore, when the probe portion 211 is placed in the receiving groove 113, the first charging member 1212 can be in close contact with the probe portion 211, so as to ensure the stability of the electrical connection.

Figure 12:
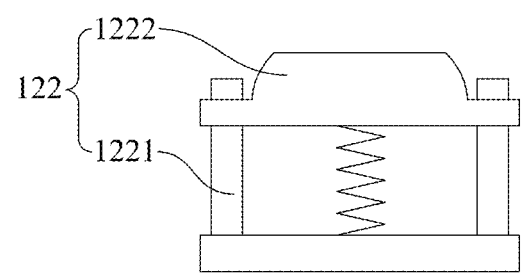
FIG. 12 is a schematic view showing a second charging assembly in the food thermometer assembly according to an embodiment of the present disclosure.

FIG. 12 is a schematic view showing a second charging assembly in the food thermometer assembly according to an embodiment of the present disclosure. In this embodiment, the second charging assembly 122 includes a second elastic guiding member 1221 and a second charging member 1222, the second elastic guiding member 1221 is installed in the second protrusion 112, and the second charging member 1222 is connected to the second elastic guiding member 1221. In case that the probe portion 211 is placed in the receiving groove 113, the second elastic guiding member 1221 enables the second charging member 1222 to abut against the first end 212a of the handle portion 212 in an axial direction of the probe portion 211. Therefore, when the probe portion 211 is placed in the receiving groove 113, the first charging member 1212 can be in close contact with the probe portion 211, so as to ensure the stability of the electrical connection.

The quantity of receiving grooves 113 in the repeater 100 may be one, so that the repeater 100 accommodates a single food thermometer 200. In some embodiments, the quantity of receiving grooves 113 in the repeater 100 may be other numbers.

Figure 13:
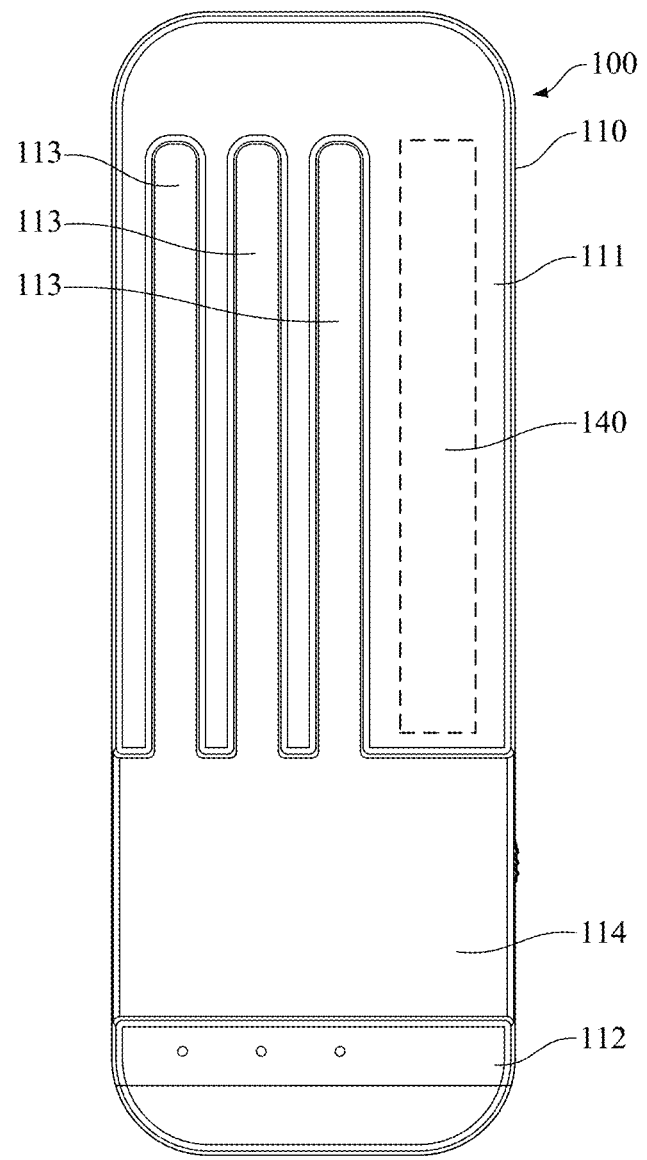
FIG. 13 is another top view of a repeater in the food thermometer assembly according to an embodiment of the present disclosure.

FIG. 13 is another top view of a repeater in the food thermometer assembly according to an embodiment of the present disclosure, the repeater 100 includes a repeater housing 110. The repeater housing 110 has a first surface S1 and a second surface S2 opposite to each other. The repeater housing 110 includes a first protrusion 111 and a second protrusion 112 protruding relative to the first surface S1, the first protrusion 111 and the second protrusion are spaced apart from each other. The first protrusion 111 has a receiving groove 113 extending through the first protrusion 111 and facing an end surface of the second protrusion 112. The quantity of receiving grooves 113 is more than two, and two or more receiving grooves 113 are arranged sequentially in the first protrusion 111. In this embodiment, a case where the repeater 100 includes three receiving grooves 113 is taken as an example for illustration. In other embodiments, the repeater 100 may include two, four, five, or other numbers of receiving grooves 113. When there are more than two receiving grooves 113 on the first protrusion 111, it is able for the repeater 100 to accommodate more than two food thermometers 200 at the same time. Furthermore, in some embodiments, the charging assembly 120 on the second protrusion 112 can be disposed opposite to the two or more receiving grooves 113, so that the repeater 100 can charge more than two food thermometers 200 at the same time, thereby to improve the usage of food thermometer assembly.

Figure 14:
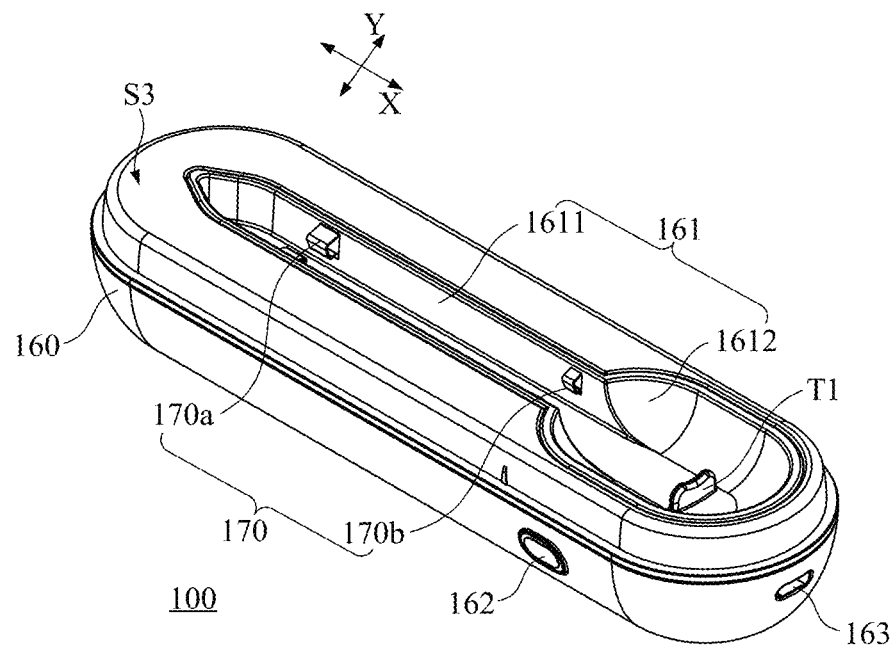
FIG. 14 is a solid view of the repeater without a cover body from a first perspective according to an embodiment of the present disclosure.
Figure 15:
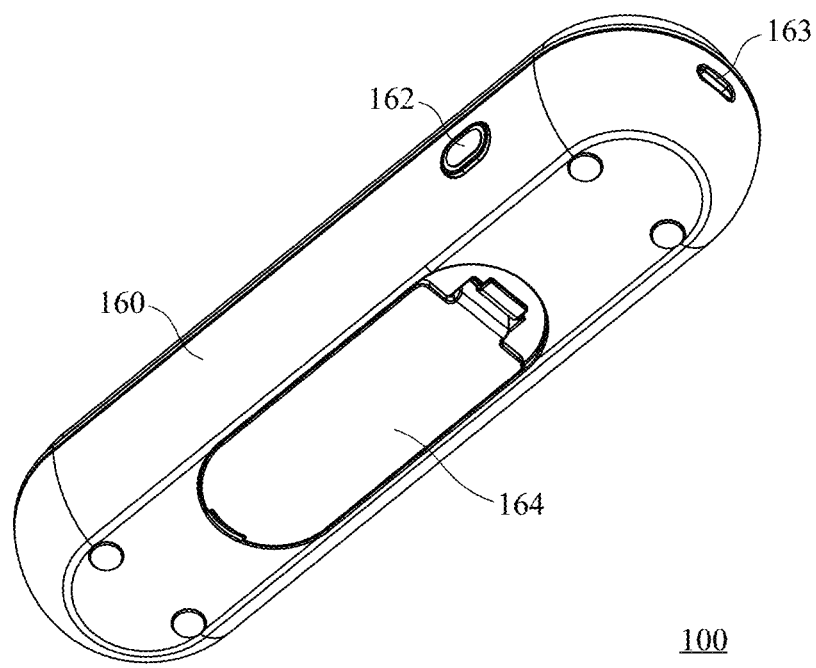
FIG. 15 is a solid view of the repeater without a cover body from a second perspective according to an embodiment of the present disclosure.

FIG. 14 is a solid view of the repeater without a cover body from a first perspective according to an embodiment of the present disclosure, FIG. 15 is a solid view of the repeater without a cover body from a second perspective according to an embodiment of the present disclosure. A repeater 100 is used for a food thermometer, and includes a base body 160 and an electrical connecting member 170.

The base body 160 has a mounting surface S3, an installation slot 161 capable of accommodating the food thermometer is provided in the mounting surface S3. The electrical connecting member 170 is provided on a side wall of the installation slot 161, and in contact with the food thermometer to charge the food thermometer. The electrical connecting member 170 has a buckle structure, the electrical connecting member 170 is elastically stretchable relative to the side wall of the installation slot 161, and in case that the food thermometer is installed in the installation slot 161, the electrical connecting member 170 is capable of fastening the food thermometer in the installation slot 161.

According to the repeater 100 in the embodiment of the present disclosure, an installation slot 161 capable of accommodating the food thermometer is provided in the mounting surface S3 of the base body 160 of the repeater 100, and the electrical connecting member 170 is provided on a side wall of the installation slot 161. The electrical connecting member 170 has a buckle structure, and is elastically stretchable relative to the side wall of the installation slot 161. During the process of installing the food thermometer into the installation slot 161, the electrical connecting member 170 is firstly pressed by the food thermometer and then indented into the side wall of the mounting slot 161. After the food thermometer is installed in place, the electrical connecting member 170 rebounds, and since the electrical connecting member 170 has a buckle structure, it is able to fasten the food thermometer in the installation slot 161, ensure that the food thermometer is stably secured in the installation slot 161, and ensure that the electrical connecting member 170 is in stable contact with the food thermometer, thereby to improve the stability of the electrical connection of the food thermometer during the charging.

In some embodiments, the electrical connecting member 170 is elastically stretchable relative to the side wall of the installation groove 161 through an elastic piece structure. In some other embodiments, an elastic member may be provided, so that the electrical connecting member 170 is elastically stretchable.

Figure 16:
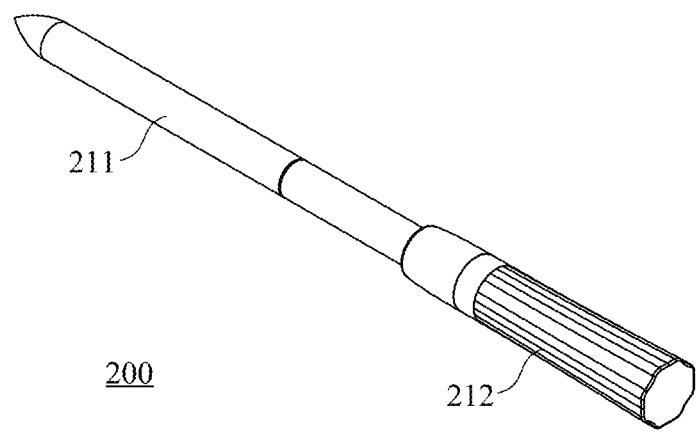
FIG. 16 is a solid view of the food thermometer according to an embodiment of the present disclosure.

FIG. 16 is a solid view of the food thermometer according to an embodiment of the present disclosure. A food thermometer 200 includes a probe portion 211 and the handle portion 212. As shown in FIG. 14, in some embodiments, the installation slot 161 includes a first sub-slot 1611 and a second sub-slot 1612 that communicate with each other, the first sub-slot 1611 extends in a first direction X in the mounting surface S3, the first sub-slot 1611 is used to accommodate at least part of the probe portion 211, the second sub-slot 1612 is connected to one end of the first sub-slot 1611, and the second sub-slot 1612 is used to accommodate at least part of the handle portion 212.

In some embodiments, the electrical connecting member 170 includes a first electrical connecting member 170a and a second electrical connecting member 170b, and one of the first electrical connecting member 170a and the second electrical connecting member 170b is connected to a positive charging electrode of the food thermometer 200, and the other thereof is connected to a negative charging electrode of the food thermometer 200; the first electrical connecting member 170a and the second electrical connecting member 170b are arranged in the first sub-slot 1611 and spaced apart from each other in the first direction X. In some embodiments, after the food thermometer 200 is stored in the repeater 100, one of the first electrical connecting member 170a and the second electrical connecting member 170b corresponds to a position of the positive charging electrode of the food thermometer 200, and the other thereof corresponds to a position of the negative charging electrode of the food thermometer 200.

In some embodiments, the first electrical connecting member 170a and the second electrical connecting member 170b each includes a pair of buckles, and buckles in each pair are correspondingly disposed on two opposite side walls of the first sub-slot 1611. In some embodiments, the first electrical connecting member 170a and the second electrical connecting member 170b may not be provided as a pair of buckles, for example, they may be each a single buckle.

In some embodiments, a width of the second sub-slot 1612 in the second direction Y is greater than a width of the first sub-slot 1611 in the second direction Y, and the second direction Y is perpendicular to the first direction X and parallel to the mounting surface S3. The second sub-slot 1612 is mainly used to accommodate the handle portion 212 of the food thermometer 200. By widening the second sub-slot 1612, it is easier to place the food thermometer 200 into the installation slot 161 or taking out the food thermometer 200 from the installation slot 161.

In some embodiments, a limiting protrusion T1 is provided on a bottom wall of the second sub-slot 1612, in case that the food thermometer 200 is installed in the installation slot 161, one end of the food thermometer 200 is capable of abutting against the limiting protrusion TI, so as to secure the food thermometer 200 in the first direction X.

Figure 17:
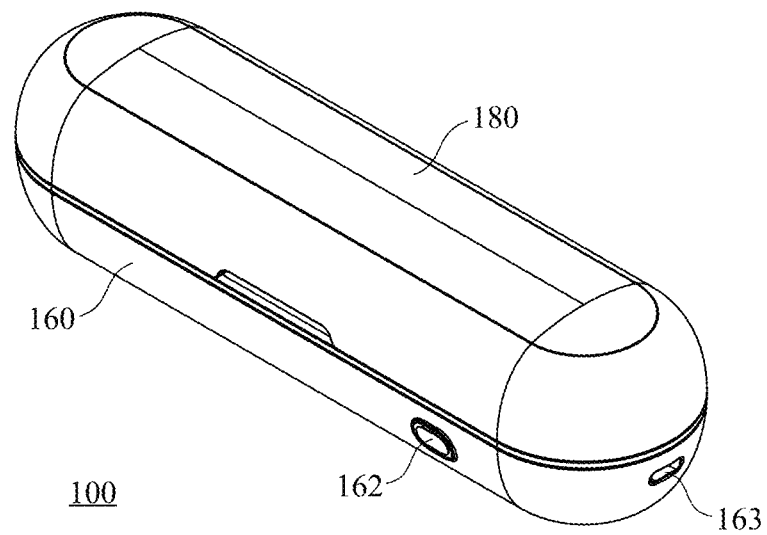
FIG. 17 is a solid view of the repeater with a cover body according to an embodiment of the present disclosure.

FIG. 17 is a solid view of the repeater with a cover body according to an embodiment of the present disclosure. In some embodiments, the repeater 100 further includes a cover body 180 capable of covering the mounting surface S3. When the cover body 180 is disposed on the mounting surface S3, it is able to provide stronger protection for the food thermometer 200 in the installation slot 161.

Figure 18:
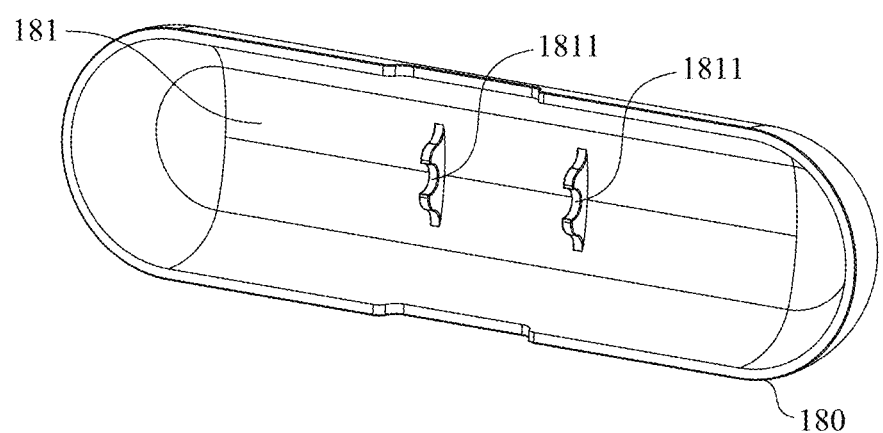
FIG. 18 is a solid view of a cover body of the repeater according to an embodiment of the present disclosure.
Figure 19:
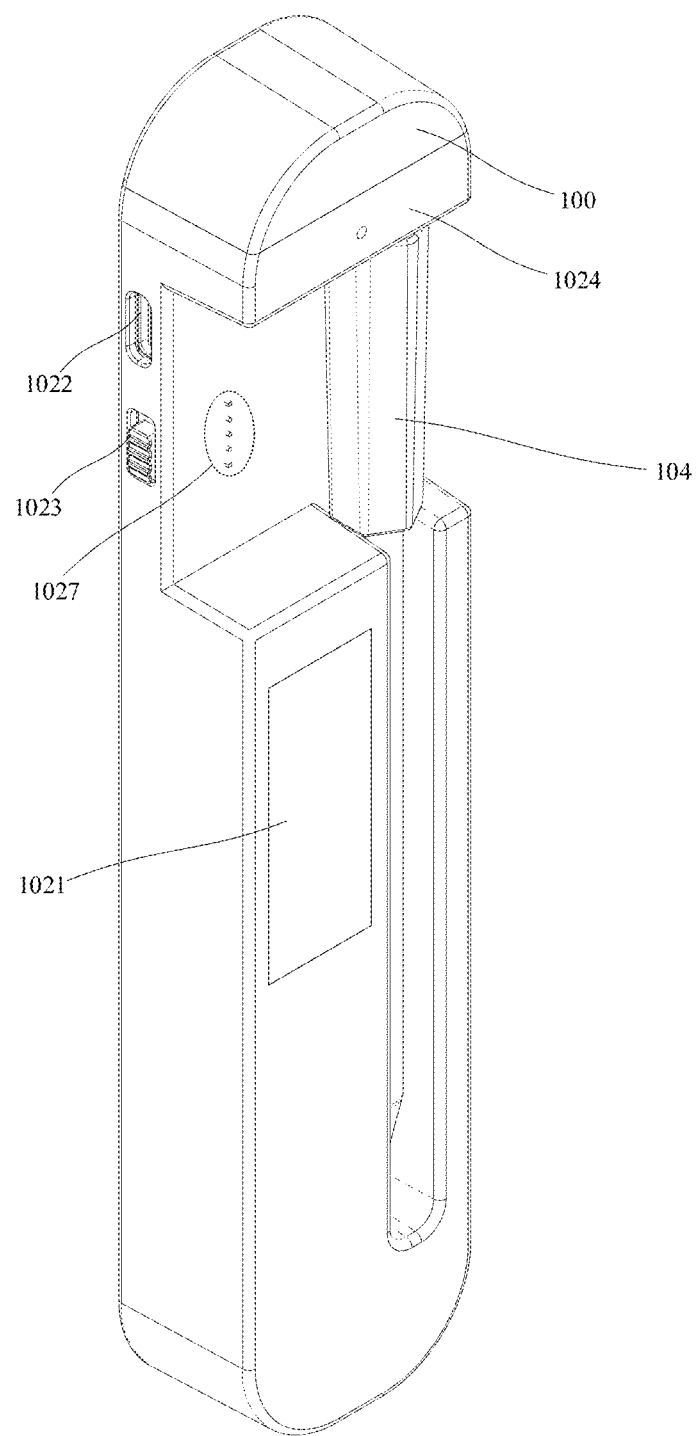
FIG. 19 is a schematic view showing the repeater according to an embodiment of the present disclosure.

FIG. 18 is a solid view of a cover body of the repeater according to an embodiment of the present disclosure. In some embodiments, a concave cavity 181 is provided on one side of the cover body 180 facing the mounting surface S3, a clamping slot 1811 is provided in the concave cavity 181, and the clamping slot 1811 is capable of clamping the food thermometer 200, so that the food thermometer 200 is fastened in the concave cavity 181.

In some embodiments, in case that one food thermometer 200 is accommodated in the installation slot 161, the concave cavity 181 of the cover body 180 can accommodate another food thermometer 200, and the cover body 180 can be disposed on the mounting surface S3.

In the above embodiments, the repeater 100 includes the cover body 180. In some other embodiments of the present disclosure, the repeater 100 may not include the cover body 180.

In some embodiments, a button 162 and an interface 163 are provided on an outer surface of the base body 160, and a battery chamber 164 is provided on a surface of the base body 160 away from the mounting surface S3. The repeater 100 further includes a circuit board located in the base body 160, and the electrical connecting member 170, the button 162, the interface 163 and the battery chamber 164 are electrically connected to the circuit board.

Embodiments of the present disclosure further provides a food thermometer assembly, which includes the repeater 100 and the food thermometer 200 in any of the above-mentioned embodiments. The repeater 100 includes a base body 160 and an electrical connecting member 170. The base body 160 having a mounting surface S3, an installation slot 161 capable of accommodating the food thermometer is provided in the mounting surface S3. The electrical connecting member 170 is provided on a side wall of the installation slot 161, and in contact with the food thermometer to charge the food thermometer. The electrical connecting member 170 has a buckle structure, the electrical connecting member 170 is elastically stretchable relative to the side wall of the installation slot 161, and in case that the food thermometer is installed in the installation slot 161, the electrical connecting member 170 is capable of fastening the food thermometer in the installation slot 161. The food thermometer 200 can be installed in the installation slot 161 of the repeater 100 and in contact with the electrical connecting member 170.

According to the food thermometer assembly in the embodiment of the present disclosure, an installation slot 161 capable of accommodating the food thermometer 200 is provided in the mounting surface S3 of the base body 160 of the repeater 100, and the electrical connecting member 170 is provided on a side wall of the installation slot 161. The electrical connecting member 170 has a buckle structure, and is elastically stretchable relative to the side wall of the installation slot 161. During the process of installing the food thermometer 200 into the installation slot 161, the electrical connecting member 170 is firstly pressed by the food thermometer 200 and then indented into the side wall of the mounting slot 161. After the food thermometer 200 is installed in place, the electrical connecting member 170 rebounds, and since the electrical connecting member 170 has a buckle structure, it is able to fasten the food thermometer 200 in the installation slot 161, ensure that the food thermometer is stably secured in the installation slot 161, and ensure that the electrical connecting member 170 is in stable contact with the food thermometer 200, thereby to improve the stability of the electrical connection of the food thermometer 200 during the charging.

Figure 20:
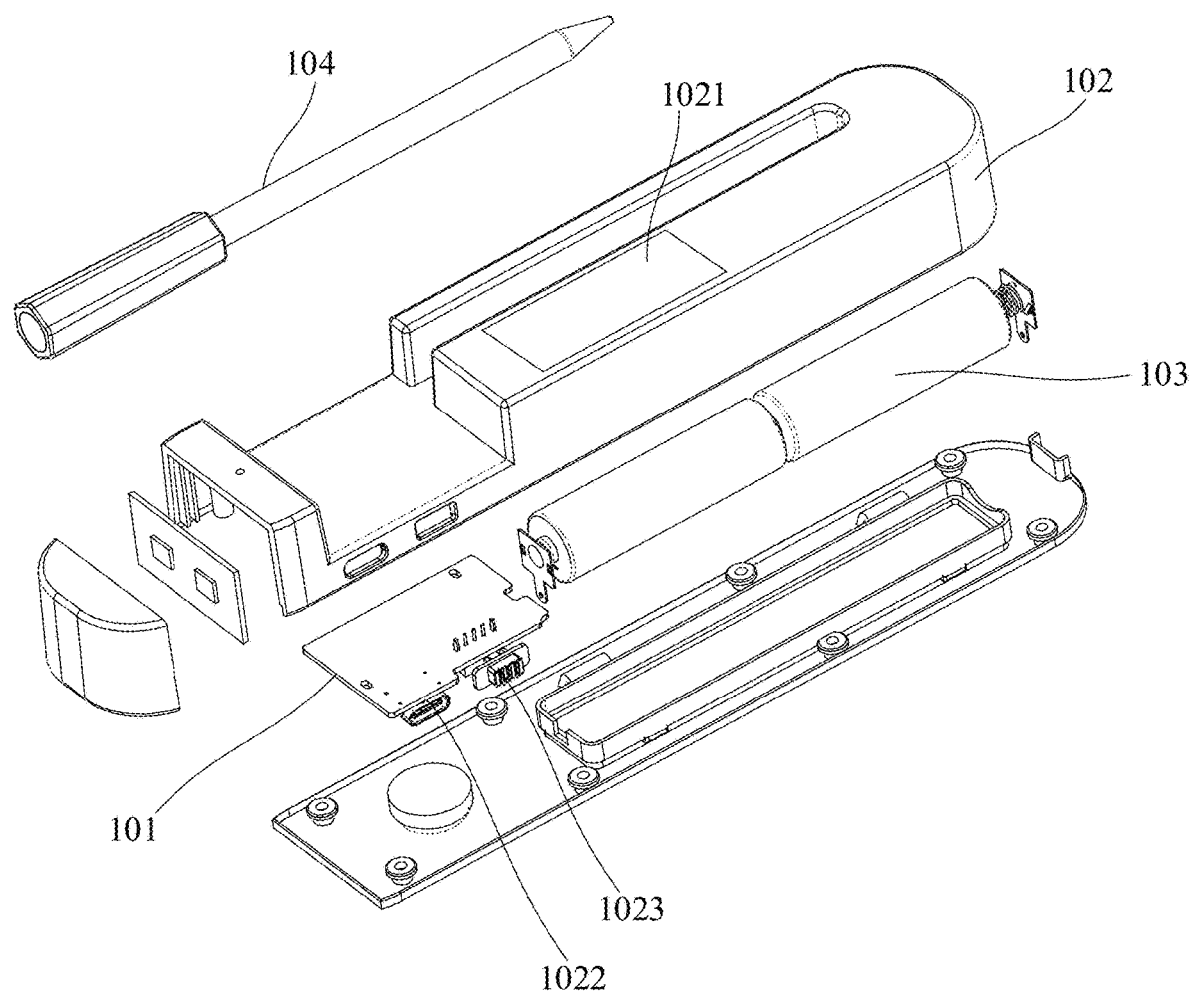
FIG. 20 is a schematic view showing an internal structure of the repeater according to an embodiment of the present disclosure.
Figure 21:
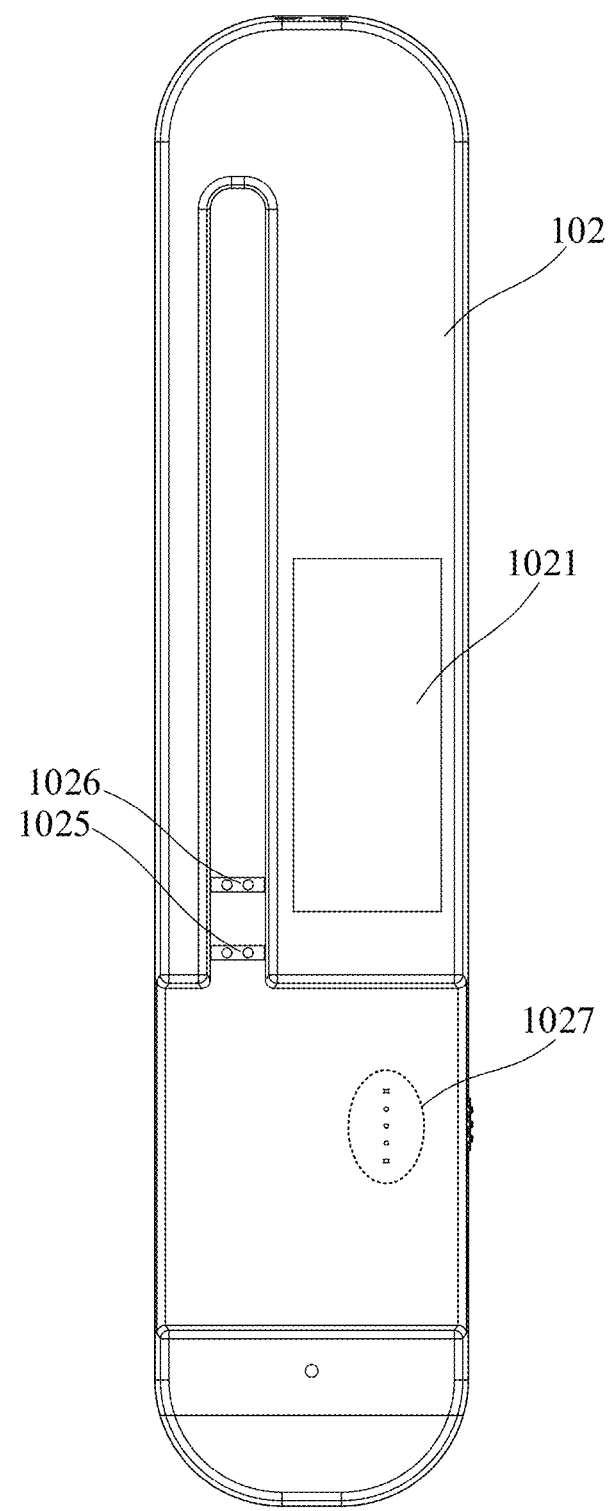
FIG. 21 is a top view of the repeater according to an embodiment of the present disclosure.
Figure 22:
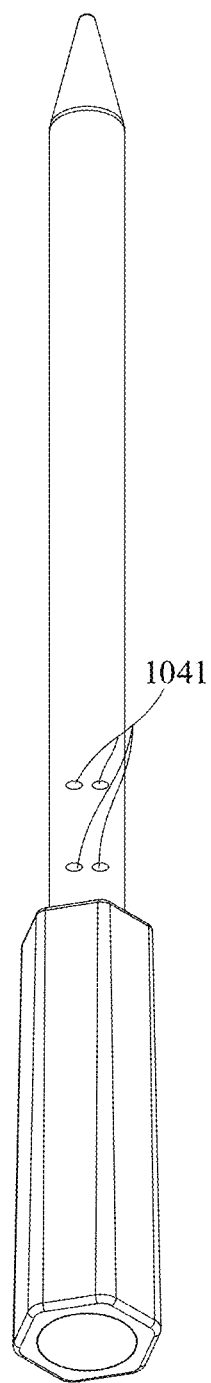
FIG. 22 is a schematic view showing a thermometer applied to the repeater according to an embodiment of the present disclosure.
Figure 23:
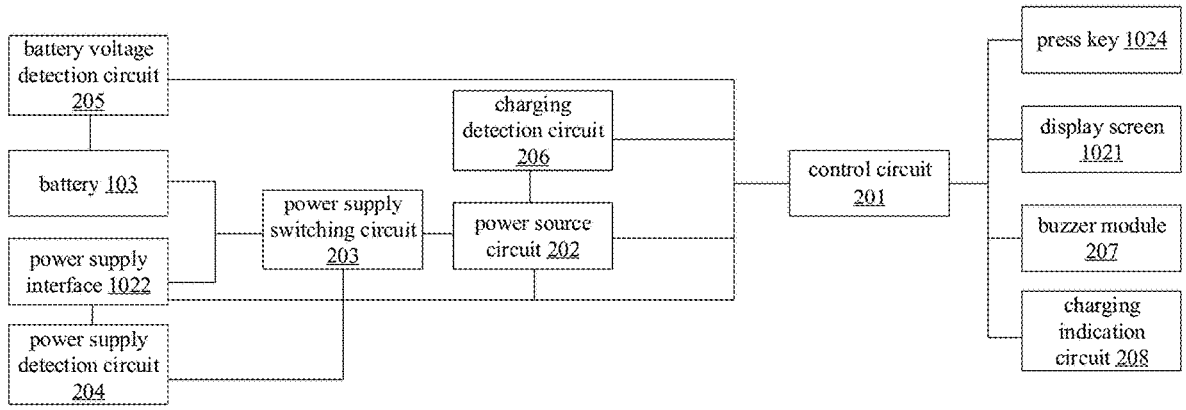
FIG. 23 is a structural block diagram of the repeater according to an embodiment of the present disclosure.

Embodiments of the present application provide a repeater, referring to FIGS. 19 to 23, FIG. 19 is a schematic view showing the repeater according to an embodiment of the present disclosure, FIG. 20 is a schematic view showing an internal structure of the repeater according to an embodiment of the present disclosure, FIG. 21 is a top view of the repeater according to an embodiment of the present disclosure, FIG. 22 is a schematic view showing a thermometer applied to the repeater according to an embodiment of the present disclosure, and FIG. 23 is a structural block diagram of the repeater according to an embodiment of the present disclosure.

As shown in FIG. 19 to FIG. 23, in the embodiment of the present disclosure, the thermometer 104 is charged through the repeater 100, the repeater 100 includes a main circuit board 101, a battery 103 and a housing 102. The main circuit board 101 includes a control circuit 201 and a power supply circuit, the power supply circuit is electrically connected to the control circuit 201, the control circuit 201 detects and controls the power supply circuit to charge the thermometer 104, and the battery 103 is electrically connected to the main circuit board 101. A power supply interface 1022 is provided on the housing 102, the power supply interface 1022 is electrically connected to the main circuit board 101, and the main circuit board 101 receives external current through the power supply interface 1022. The repeater 100 may charge the thermometer 104 through the battery 103 or the external current from the power supply interface 1022.

Figure 24:
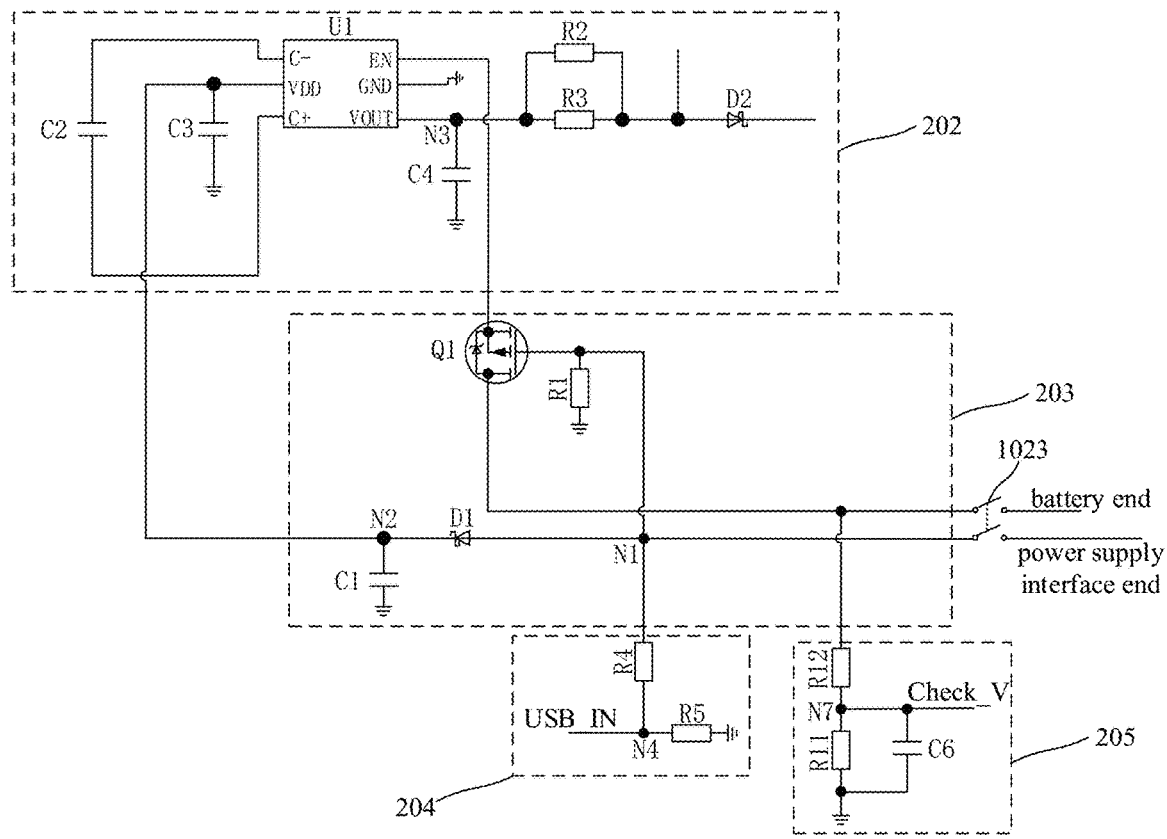
FIG. 24 is a circuit diagram of a power supply part of the repeater according to an embodiment of the present disclosure.

As shown in FIG. 24, the power supply circuit includes a power source circuit 202 and a power supply switching circuit 203, the power source circuit 202 is electrically connected to the control circuit 201, and the power source circuit 202 converts current outputted by the battery 103 or the power supply interface 1022 into stable power supply current. The power supply switching circuit 203 is electrically connected to the power source circuit 202, the battery 103 and the power supply interface 1022, the power supply switching circuit 203 includes a first field effect transistor Q1, and the first field effect transistor Q1 enables the battery 103 to be electrically connected to the power source circuit 202 in case that the power supply interface 1022 does not receive external current, and enables the battery 103 to be electrically disconnected from the power source circuit 202 in case that the power supply interface 1022 receives external current. In other words, when the power supply interface 1022 receives external current, the repeater 100 supplies power to the thermometer 104 through the external current from the power supply interface 1022. When the power supply interface 1022 does not receive external current, the repeater 100 supplies power to the thermometer 104 through the battery 103.

The control circuit 201 is a RISC-V microcontroller with model number CH582F that integrates Bluetooth Low Energy (BLE) wireless communication. The power supply interface 1022 may be a USB TYPE-C interface, or a USB TYPE-A interface, micro-USB interface, etc. The battery 103 may be charged through the power supply interface 1022, and the firmware of the control circuit 201 may also be updated through the power supply interface 1022.

Optionally, a display device is further provided on the housing 102, the display device is electrically connected to the control circuit 201, and the display device is capable of displaying power information of the battery 103 and power information of the thermometer 104 during charging. When the thermometer 104 is placed on the repeater 100 for charging, the control circuit 201 can display the power of the battery 103 in the repeater 100, the working status of the repeater 100 and the power of the thermometer 104 through the display device.

Optionally, the power supply switching circuit 203 further includes a first resistor R1, a first Schottky diode D1 and a first capacitor C1, a first end of the first field effect transistor Q1 is connected to the battery 103, a second end of the first field effect transistor Q1 is electrically connected to the power source circuit 202, a control end of the first field effect transistor Q1 is electrically connected to the power supply interface 1022, and the first field effect transistor Q1 is a P-channel field effect transistor. There is a first node N1 between the control end of the first field effect transistor Q1 and the power supply interface 1022, the first resistor R1 is electrically connected to the first node N1 and grounded, and the power supply interface 1022, the first Schottky diode D1, a second node N2 and the power source circuit 202 are electrically connected sequentially. A first end of the first capacitor C1 is electrically connected to the second node, and a second end of the first capacitor C1 is grounded.

Optionally, the power source circuit includes a second resistor R2, a third resistor R3, a second Schottky diode D2, a second capacitor C2, a third capacitor C3r, a fourth capacitor C4 and a power source processor U1, a power source end of the power source processor U1 is connected to the second node N2, a first end of the power source processor U1 is electrically connected to a first end of the second capacitor C2. A second end of the power source processor U1 is electrically connected to a second end of the second capacitor C2, an enable end of the power source processor U1 is electrically connected to the second end of the first field effect transistor Q1, a voltage output end of the power source processor U1 is configured to output a voltage, and a ground end of the power source processor U1 is grounded. A first end of the third capacitor C3 is electrically connected to the power source end of the power source processor U1, and a second end of the third capacitor C3 is grounded. The voltage output end of the power source processor U1, a third node N3, the third resistor R3, the second Schott diode D2 are electrically connected sequentially, the second resistor R2 and the third resistor R3 are electrically connected in parallel, a first end of the fourth capacitor C4 is electrically connected to the third node N3, and a second end of the fourth capacitor C4 is grounded.

Optionally, the power supply circuit further includes a detection circuit electrically connected to the control circuit 201 and the battery 103, the detection circuit detects an operating status of the main circuit board 101.

Optionally, the detection circuit includes a power supply detection circuit 204 electrically connected to the control circuit 201 and the power supply interface 1022, the power supply detection circuit 204 detects a potential of the power supply interface 1022 to obtain potential information, the control circuit 201 generates power supply information based on the potential information and controls the display device to display the power supply information.

Furthermore, the power supply detection circuit 204 includes a fourth resistor R4 and a fifth resistor R5, the first node N1, the fourth resistor R4, a fourth node N4, the fifth resistor R5 are electrically connected sequentially, a second end of the fifth resistor R4 is grounded, the fourth node R4 is electrically connected to the control circuit 201, and the power supply detection circuit 204 transmits a low-level signal to the control circuit 201 in case that the power supply interface 1022 does not receive external current, and transmits a high-level signal to the control circuit 201 in case that the power supply interface 1022 receives external current.

Figure 25:
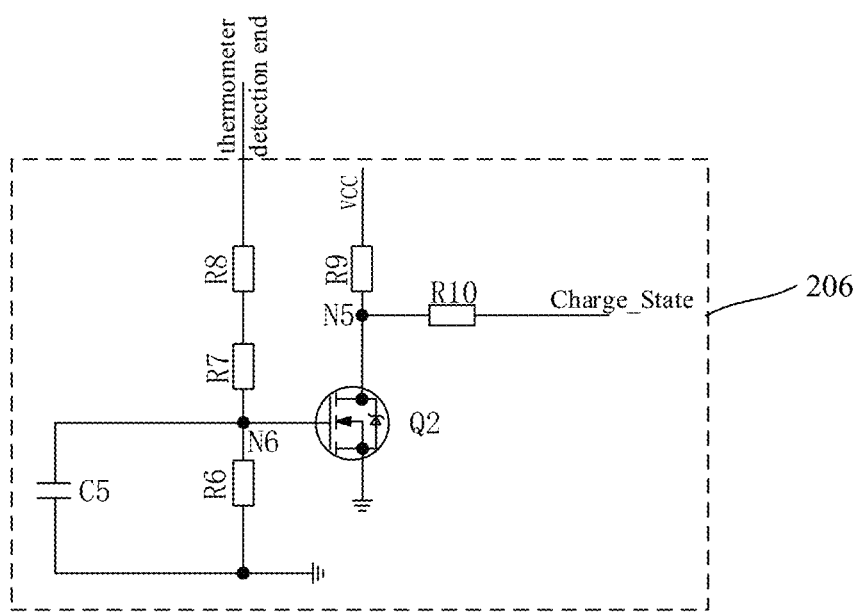
FIG. 25 is a circuit diagram of a charging detection circuit of the repeater according to an embodiment of the present disclosure.

Optionally, the detection circuit further includes a charging detection circuit 206. As shown in FIG. 25, the charging detection circuit 206 is electrically connected to the control circuit 201, the charging detection circuit 206 includes a second field effect transistor Q2, a fifth capacitor C5, a sixth resistor R6, a seventh resistor R7, an eighth resistor R8, a ninth resistor R9 and a tenth resistor R10, a first end of the second field effect transistor Q2 is grounded, a second end of the second field effect transistor Q2 is electrically connected to the control circuit 201, a control end of the second field effect transistor, the seventh resistor R7, the eighth resistor R8 and a thermometer detection end are electrically connected sequentially, and the second field effect transistor Q2 is an N-channel field effect transistor. There is a fifth node N5 between the second end of the second field effect transistor Q2 and the control circuit 201, a first end of the ninth resistor R9 is electrically connected to the fifth node N5, and a second end of the ninth resistor R9 is electrically connected to a power source voltage end of the control circuit 201. A first end of the tenth resistor R10 is electrically connected to the fifth node N5, and a second end of the tenth resistor R10 is electrically connected to a charging state end of the control circuit 201. There is a sixth node N6 between the control end of the second field effect transistor Q2 and the seventh resistor R7, a first end of the sixth resistor R6 is electrically connected to the sixth node N6, a second end of the sixth resistor R6 is grounded, and the fifth capacitor C5 is connected in parallel to the sixth resistor R6.

When the thermometer 104 is low in power, a gate voltage of the second field effect transistor Q2 is pulled down and the second field effect transistor Q2 is turned off. In other words, the second field effect transistor Q2 generates a to-be-charged signal. The control circuit 201 generates to-be-charged information according to the to-be-charged signal and controls the display device to display the to-be-charged information. When the thermometer is fully charged, the gate voltage of the second field effect transistor Q2 is restored to a high level, and the second field effect transistor Q2 is turned on to generate a full-charge signal. The control circuit 201 generates full-charge information based on the full-charge signal and controls the display device to display the full-charge information.

Optionally, the display device is a display screen 1021 and/or an indicator. When the display device is the display screen 1021, the display screen 1021 is electrically connected to the control circuit 201. The display screen 1021 displays the power information of the battery 103 and the power information of the thermometer 104 during charging. When the thermometer 104 is placed on the repeater 100 for charging, the control circuit 201 can display the power of the battery 103 in the repeater 100, the working status of the repeater 100, and the power of the thermometer 104 through the display screen 1021. When the display device is the indicator, the indicator is a charging status indicator 1027 including multiple indicators. The charging status indicator 1027 is electrically connected to the control circuit 201. The control circuit 201 obtains the power information of the thermometer 104 through the charging detection circuit 206, and controls one or more corresponding indicators in the charging status indicator 1027 to emit light based on the power information of the thermometer 104.

In this embodiment, the charging status indicator 1027 includes five indicators. When the power of the thermometer 104 is lower than 20%, one indicator of the charging status indicator 1027 emits light. When the power of the thermometer 104 is greater than 20% and lower than 40%, two indicators of the charging status indicator 1027 emit light. Similarly, when the power of the thermometer 104 is fully charged, all five indicators of the charging status indicator 1027 emit light.

Optionally, when the thermometer 104 is not placed in the repeater 100, the charging status indicator 1027 is used to indicate the power of the battery 103 of the repeater 100. In a case where the power of the battery 103 is higher than 80%, all five indicators are turned on. In a case where the power of the battery 103 is 60%-80%, four indicators are turned on. In a case where the power of the battery 103 is 40%-60%, three indicators are all turned on . . . . In a case where the power of the battery 103 is lower than 20%, one indicator is turned on. In a case where the power of the battery is lower than a working power, none of the indicators is turned on.

Optionally, when the display device is the display screen 1021 and the charging status indicator 1027, the display screen 1021 and the charging status indicator 1027 are electrically connected to the control circuit 201, and the display screen 1021 displays the power information of the battery 103 and the power information of the thermometer 104 during charging. The charging status indicator 1027 displays the working status of the repeater 100 through the indicators. When the thermometer 104 is placed on the repeater 100 for charging, the control circuit 201 displays the power of the battery 103 in the repeater 100, the working status of the repeater 100 and the power of the thermometer 104 through the display device.

Optionally, the above-mentioned charging status indicator 1027 may further be set to emit light in different colors, which will not be particularly defined herein.

Optionally, the detection circuit further includes a battery voltage detection circuit 205. The battery voltage detection circuit 205 includes an eleventh resistor R11, a twelfth resistor R12 and a sixth capacitor C6, there is a seventh node N7 between the eleventh resistor R11 and the twelfth resistor R12, a first end of the twelfth resistor R12 is electrically connected to the battery 103, a second end of the twelfth resistor R12 is electrically connected to the seventh node N7, a first end of the eleventh resistor R11 is connected to the control circuit 201 through the seventh node N7, a second end of the eleventh resistor R11 is grounded, the sixth capacitor C6 is connected in parallel to the eleventh resistor R11, and the battery voltage detection circuit 205 is used to detect voltage information of the battery 103 and send the voltage information to the control circuit 201.

Optionally, the detection circuit further includes a charging indication circuit 208. The charging indication circuit 208 is electrically connected to the control circuit 201. The charging indication circuit 208 emits a corresponding prompt according to the charging status of the thermometer 104.

In addition, the charging indication circuit 208 obtains whether the repeater 100 is in a charging state through the control circuit 201, and emits a corresponding indication through LEDs in two colors. In a case where the thermometer 104 is charged on the repeater 100, a red LED of the LEDs in two colors flashes. In a case where the thermometer 104 is fully charged or working, a blue LED of the LEDs in two colors flashes.

Optionally, the main circuit board 101 further includes a buzzer module 207. The buzzer module 207 is electrically connected to the control circuit 201. The buzzer module 207 is used to emit corresponding prompt sound according to the charging status of the repeater 100.

In addition, the buzzer module 207 is a passive electromagnetic buzzer that is driven by an NPN transistor (such as S8085) to emit corresponding prompt sound.

In some embodiments, the repeater 100 includes at least one of the indicator and the buzzer module 207, thereby having a sound alarm, a light alarm, or a sound and light alarm function. In addition, the repeater 100 has the function of canceling the alarm. The repeater 100 can communicate with a terminal, such as a mobile phone, a tablet computer, a personal computer, etc. The repeater 100 and the terminal can cooperate to emit an alarm and cancel an alarm. The repeater and the terminal cooperate to cancel an alarm, it means that one of the devices cancels the alarm, and the remaining communication-connected devices also cancel the alarm. The repeater 100 serves as a relay device for communication between the thermometer 104 and the terminal. In some embodiments, multiple thermometers 104 and multiple repeaters 100 may be connected to the terminal for communication at the same time.

Optionally, one or more charging contacts 1041 are provided on the thermometer 104, and a positive charging contact electrode 1025 and a negative charging contact electrode 1026 corresponding to the charging contacts 1041 of the thermometer 104 are further provided on the housing 102. The thermometer 104 is electrically connected to the positive charging contact electrode 1025 and the negative charging contact electrode 1026 on the repeater 100 through the charging contacts 1041, so as to realize charging of the thermometer 104.

Optionally, a press key 1024 and a sliding switch 1023 are further provided on the housing 102. The control circuit 201 can activate a corresponding function in response to different triggering manners of the press key 1024 (such as single click, double click, long press, etc.). The sliding switch 1023 serves as a main switch of the repeater 100, and controls the repeater 100 to be electrically connected to, or electrically disconnected from, the battery 103 and the power supply interface 1022.

The repeater 100 in the embodiment of the present application can real-time display the power of the thermometer 104 when the thermometer 104 is charged on the repeater 100, the power of the battery 103 in the repeater 100, and the working status of the repeater 100, so that the power status of the thermometer 104 during charging can be quickly obtained and it can be determined whether the battery 103 of the repeater 100 needs to be charged based on the power information of the battery 103 of the repeater 100 displayed on the display device.

The above are only preferred embodiments of the present disclosure, and not intended to limit the scope of the present disclosure. Under the concept of the present disclosure, equivalent structural transformations obtained using the contents of the description and drawings of the present disclosure, or the contents of the description and drawings of the present disclosure being directly/indirectly applied into other related technical fields are encompassed in the scope of the present disclosure.

What is claimed is:

1. A food thermometer comprising: a thermometer housing, a temperature sensor, a communication circuit and an antenna;
   wherein the thermometer housing comprises a probe portion and a handle portion connected to one end of the probe portion, and at least part of the probe portion is to be inserted into food;
   the handle portion is an electrical insulator, at least part of the probe portion has a metal structure;
   the temperature sensor is arranged in the thermometer housing and configured to sense and obtain temperature information, the communication circuit is electrically connected to the temperature sensor and configured to transmit the temperature information to the outside through the antenna, the antenna is arranged at the handle portion and insulated, and spaced apart, from the probe portion, the communication circuit is arranged in the handle portion and connected to the antenna;
   wherein the food thermometer further comprises a main control board arranged in the thermometer housing, wherein the temperature sensor and the communication circuit are electrically connected to the main control board;
wherein the food thermometer further comprises:
a power storage element arranged in the probe portion, wherein the power storage element is electrically connected to the main control board;
a first charging contact and a second charging contact that are electrically connected to the power storage element through the main control board, wherein at least one of the first charging contact or the second charging contact is arranged at the probe portion;
wherein the probe portion comprises a first probe section adjacent to the handle portion and a second probe section on a side of the first probe section away from the handle portion, the second probe section has a metal structure, at least part of a wall surface of the first probe section is set as an electrical insulation member, at least one of the first charging contact or the second charging contact is arranged on the electrical insulation member;
wherein the first charging contact is arranged on the electrical insulation member, and the second charging contact is arranged on the handle portion; or,
wherein the first charging contact and the second charging contact are arranged on the electrical insulation member; or,
wherein at least one of the first charging contact or the second charging contact has an annular structure circumferentially surrounding the thermometer housing.

2. The food thermometer according to claim 1, further comprising
a heat-insulation fixing member arranged in the handle portion, the heat-insulation fixing member wraps the communication circuit and the communication circuit is fixedly connected to an inner wall of the handle portion through the heat-insulation fixing member.

3. The food thermometer according to claim 2, wherein the communication circuit is arranged separately from the main control board, and the main control board is located in the probe portion; or,
wherein the communication circuit is integrated on the main control board, the main control board comprises a first part in the probe portion and a second part extending into the handle portion, and the communication circuit is on the second part;
wherein the heat-insulation fixing member wraps the second part and the second part is fixedly connected to the inner wall of the handle portion through the heat-insulation fixing member.

4. The food thermometer according to claim 1, wherein the antenna is disposed at an end of the handle portion away from the probe portion; or,
wherein the antenna is arranged on a circumferential wall of the handle portion.

5. The food thermometer according to claim 1, wherein the temperature sensor comprises a first temperature sensor and a second temperature sensor, the first temperature sensor is disposed in the probe portion, and the second temperature sensor is disposed in the handle portion;
wherein the first temperature sensor is in contact with the probe portion to sense internal temperature of the food through the probe portion, and the second temperature sensor is in contact with the antenna to sense ambient temperature through the antenna.

6. A repeater for the food thermometer according to claim 1, comprising:
a base body having a mounting surface, wherein an installation slot capable of accommodating the food thermometer is provided in the mounting surface;
an electrical connecting member provided on a side wall of the installation slot, and in contact with the food thermometer to charge the food thermometer, wherein the electrical connecting member has a buckle structure, the electrical connecting member is elastically stretchable relative to the side wall of the installation slot, and in case that the food thermometer is installed in the installation slot, the electrical connecting member is capable of fastening the food thermometer in the installation slot.

7. The repeater according to claim 6, wherein the food thermometer comprises the probe portion and the handle portion, the installation slot comprises a first sub-slot and a second sub-slot that communicate with each other, the first sub-slot extends in a first direction in the mounting surface, the first sub-slot is used to accommodate at least part of the probe portion, the second sub-slot is connected to one end of the first sub-slot, and the second sub-slot is used to accommodate at least part of the handle portion.

8. The repeater according to claim 7, wherein the electrical connecting member comprises a first electrical connecting member and a second electrical connecting member, and one of the first electrical connecting member and the second electrical connecting member is connected to a positive charging electrode of the food thermometer, and the other thereof is connected to a negative charging electrode of the food thermometer; the first electrical connecting member and the second electrical connecting member are arranged in the first sub-slot and spaced apart from each other in the first direction;
wherein the first electrical connecting member and the second electrical connecting member each comprises a pair of buckles, and buckles in each pair are correspondingly disposed on two opposite side walls of the first sub-slot.

9. The repeater according to claim 7, wherein a width of the second sub-slot in the second direction is greater than a width of the first sub-slot in the second direction, and the second direction is perpendicular to the first direction and parallel to the mounting surface;
and/or,
wherein a limiting protrusion is provided on a bottom wall of the second sub-slot, in case that the food thermometer is installed in the installation slot, one end of the food thermometer is capable of abutting against the limiting protrusion.

10. The repeater according to claim 6, further comprising:
a cover body capable of covering the mounting surface;
wherein a concave cavity is provided on one side of the cover body facing the mounting surface, a clamping slot is provided in the concave cavity, and the clamping slot is capable of clamping the food thermometer, so that the food thermometer is fastened in the concave cavity.

11. The repeater according to claim 6, further comprising:
a main circuit board, comprising a control circuit and a power supply circuit, wherein the power supply circuit is electrically connected to the control circuit, the control circuit detects and controls the power supply circuit to charge the thermometer;
a battery electrically connected to the main circuit board; and
a housing, wherein a power supply interface is provided on the housing, the power supply interface is electrically connected to the main circuit board, and the main circuit board receives external current through the power supply interface;

wherein the power supply circuit comprises a power source circuit and a power supply switching circuit, the power source circuit is electrically connected to the control circuit, and the power source circuit converts current outputted by the battery or the power supply interface into stable power supply current; the power supply switching circuit is electrically connected to the power source circuit, the battery and the power supply interface, the power supply switching circuit comprises a first field effect transistor, and the first field effect transistor enables the battery to be electrically connected to the power source circuit in case that the power supply interface does not receive external current, and enables the battery to be electrically disconnected from the power source circuit in case that the power supply interface receives external current.

12. The repeater according to claim 11, wherein a display device is further provided on the housing, the display device is electrically connected to the control circuit, and the display device is capable of displaying power information of the battery and power information of the thermometer during charging.

13. The repeater according to claim 12, wherein the power supply switching circuit further comprises a first resistor, a first Schottky diode and a first capacitor, a first end of the first field effect transistor is connected to the battery, a second end of the first field effect transistor is electrically connected to the power source circuit, a control end of the first field effect transistor is electrically connected to the power supply interface, and the first field effect transistor is a P-channel field effect transistor; there is a first node between the control end of the first field effect transistor and the power supply interface, the first resistor is electrically connected to the first node and grounded, and the power supply interface, the first Schottky diode, a second node and the power source circuit are electrically connected sequentially; a first end of the first capacitor is electrically connected to the second node, and a second end of the first capacitor is grounded;

wherein the power source circuit comprises a second resistor, a third resistor, a second Schottky diode, a second capacitor, a third capacitor, a fourth capacitor and a power source processor, a power source end of the power source processor is connected to the second node, a first end of the power source processor is electrically connected to a first end of the second capacitor, a second end of the power source processor is electrically connected to a second end of the second capacitor, an enable end of the power source processor is electrically connected to the second end of the first field effect transistor, a voltage output end of the power source processor is configured to output a voltage, and a ground end of the power source processor is grounded; a first end of the third capacitor is electrically connected to the power source end of the power source processor, and a second end of the third capacitor is grounded; the voltage output end of the power source processor, a third node, the third resistor, the second Schottky diode are electrically connected sequentially, the second resistor and the third resistor are electrically connected in parallel, a first end of the fourth capacitor is electrically connected to the third node, and a second end of the fourth capacitor is grounded.

14. The repeater according to claim 13, wherein the power supply circuit further comprises:

a detection circuit electrically connected to the control circuit and the battery, wherein the detection circuit detects an operating status of the main circuit board;

wherein the detection circuit comprises: a power supply detection circuit electrically connected to the control circuit and the power supply interface, wherein the power supply detection circuit detects a potential of the power supply interface to obtain potential information, the control circuit generates power supply information based on the potential information and controls the display device to display the power supply information.

15. The repeater according to claim 14, wherein the power supply detection circuit comprises a fourth resistor and a fifth resistor, the first node, the fourth resistor, a fourth node, the fifth resistor are electrically connected sequentially, a second end of the fifth resistor is grounded, the fourth node is electrically connected to the control circuit, and the power supply detection circuit transmits a low-level signal to the control circuit in case that the power supply interface does not receive external current, and transmits a high-level signal to the control circuit in case that the power supply interface receives external current.

16. The repeater according to claim 14, wherein the detection circuit further comprises:

a charging detection circuit, wherein the charging detection circuit is electrically connected to the control circuit, the charging detection circuit comprises a second field effect transistor, a fifth capacitor, a sixth resistor, a seventh resistor, an eighth resistor, a ninth resistor and a tenth resistor, a first end of the second field effect transistor is grounded, a second end of the second field effect transistor is electrically connected to the control circuit, a control end of the second field effect transistor, the seventh resistor, the eighth resistor and a thermometer detection end are electrically connected sequentially, and the second field effect transistor is an N-channel field effect transistor; there is a fifth node between the second end of the second field effect transistor and the control circuit, a first end of the ninth resistor is electrically connected to the fifth node, and a second end of the ninth resistor is electrically connected to a power source voltage end of the control circuit; a first end of the tenth resistor is electrically connected to the fifth node, and a second end of the tenth resistor is electrically connected to a charging state end of the control circuit; there is a sixth node between the control end of the second field effect transistor and the seventh resistor, a first end of the sixth resistor is electrically connected to the sixth node, a second end of the sixth resistor is grounded, and the fifth capacitor is connected in parallel to the sixth resistor;

the second field effect transistor generates a to-be-charged signal when the thermometer is low in power, and the control circuit generates to-be-charged information according to the to-be-charged signal and controls the display device to display the to-be-charged information; the second field effect transistor generates a full-charge signal when the thermometer is fully charged, and the control circuit generates full-charge information based on the full-charge signal and controls the display device to display the full-charge information.

17. The repeater according to claim 14, wherein the detection circuit further comprises: a battery voltage detection circuit, wherein the battery voltage detection circuit comprises an eleventh resistor, a twelfth resistor and a sixth capacitor, there is a seventh node between the eleventh resistor and the twelfth resistor, a first end of the twelfth resistor is electrically connected to the battery, a second end of the twelfth resistor is electrically connected to the seventh node, a first end of the eleventh resistor is connected to the control circuit through the seventh node, a second end of the eleventh resistor is grounded, the sixth capacitor is connected in parallel to the eleventh resistor, and the battery voltage detection circuit is used to detect voltage information of the battery and send the voltage information to the control circuit.

18. The repeater according to claim 14, wherein the display device is a display screen and/or an indicator, and the detection circuit further comprises:
   a charging indication circuit electrically connected to the control circuit, wherein the charging indication circuit emits a corresponding prompt according to a charging status of the thermometer.

\* \* \* \* \*